United States Patent [19]

Kodavalla et al.

[11] Patent Number: 5,717,919
[45] Date of Patent: Feb. 10, 1998

[54] DATABASE SYSTEM WITH METHODS FOR APPENDING DATA RECORDS BY PARTITIONING AN OBJECT INTO MULTIPLE PAGE CHAINS

[75] Inventors: Hanuma Kodavalla, Union City; Ashok Madhukar Joshi; Sumanta Chatterjee, both of Fremont; Bruce McCready, San Francisco, all of Calif.

[73] Assignee: Sybase, Inc., Emeryville, Calif.

[21] Appl. No.: 537,020

[22] Filed: Oct. 2, 1995

[51] Int. Cl.$^6$ ........................................... G06F 17/30
[52] U.S. Cl. ..................... 395/608; 395/617; 395/610; 395/792; 364/225.8
[58] Field of Search .................................. 395/608, 617, 395/610, 761, 792, 772, 770; 364/225.8

[56] References Cited

U.S. PATENT DOCUMENTS

| 5,025,369 | 6/1991 | Schwartz | 395/672 |
|---|---|---|---|
| 5,459,862 | 10/1995 | Garliepp et al. | 395/608 |
| 5,485,607 | 1/1996 | Lomet et al. | 395/608 |
| 5,546,579 | 8/1996 | Josten et al. | 395/608 |
| 5,594,881 | 1/1997 | Fecteau et al. | 394/419 |

OTHER PUBLICATIONS

Sybase Inc. author unknown, "Sybase SQL Server 11: Performance Optimized for Real–World Results", pp. 1–11, obtained off the internet http://www.sybase.com, Oct. 1995.

David Lomet, "Key Range Locking Strategies Improved for Concurrency", obtained off the internet http://gatekeeper.dec, Feb. 10, 1993.

Laurent Daynes et al., "Locking in ODBMS Client Supporting Nested Transaction," IEEE Data Engineering, 1995 11th International Conference, pp. 316–323, Mar. 6, 1995.

*Primary Examiner*—Thomas G. Black
*Assistant Examiner*—Greta L. Robinson
*Attorney, Agent, or Firm*—John A. Smart; David N. Slone

[57] ABSTRACT

A Client/Server Database System with improved methods for appending items to an object, such as appending data records to a database table, in the context of a multi-user environment is described. The system includes one or more Clients (e.g., Terminals or PCs) connected via a Network to a Server. The Clients store data in and retrieve data from one or more database tables resident on the Server by submitting SQL commands, some of which specify insert or append operations, for appending records to a table. For enhancing the speed in which multiple appenders (i.e., Clients) can append records, the operation of the server is modified to store an object (e.g., table) as multiple (physical) page chains. From the logical viewpoint, a single (logical) page chain of data pages is presented to each client or user. From the perspective of inserting records, however, the system has multiple page chains to insert into, thereby removing contention among multiple appenders for the last page.

30 Claims, 7 Drawing Sheets

DATABASE SYSTEM WITH METHODS FOR APPENDING DATA RECORDS BY PARTITIONING AN OBJECT INTO MULTIPLE PAGE CHAINS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to maintenance and processing of information stored in a SQL-based data processing system, such as a SQL Relational Database Management System (RDBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee. Here, each record contains fields designating specifics about the employee, such as name, home address, salary, and the like.

Between the actual physical database itself (i.e., the records contained in data pages stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. As the migration to client/server continues, each day more and more businesses are run from mission-critical systems which store information on server-based SQL database systems, such as Sybase SQL Server™. As a result, increasingly higher demands are being placed on server-based SQL database systems to provide transaction processing to increasingly larger numbers of clients. Accordingly, there is much interest in improving the performance of such systems.

In a database server environment, a problem exists in that there is often contention (e.g., among multiple clients) for appending records to a database table. In particular, this "multiple appender" problem exists when contention exists among multiple clients for the end (i.e., last "data page") of a table where records are appended to its end (e.g., for a non-clustered index table). This problem results because, in typical operation, the last page must be locked by the transaction which is performing the insert of a new data record; the lock for the page must be held for the duration of the transaction. As a result, any other client which desires to insert an object into that page (e.g., insert a row or record into that page) is blocked—that client must wait until the lock on that page is lifted, typically when the (blocking) transaction commits. From the perspective of a client, this problem manifests itself as a reduction in concurrency. Effectively, the client sees serial inserts, because there can only be one transaction holding the lock on the last page.

Although the foregoing problem has been described in terms of a particular client posting a transaction, the problem is much more general. It is a common problem that transactions need to write some information about "what they have done" in a multi-client environment. Examples include histories, audit logs, and the like. Stated generally, therefore, the problem exists in any environment where append-only operations occur with multiple appenders. This occurs in a client/server environment in the very common instance of multiple clients inserting records. In an append-only situation, by definition, the only location where records can be inserted is at the end. Accordingly, in this scenario, the point of contention or "bottleneck" occurs at the end, such as the last data page.

One approach to addressing the problem is to maintain a "free list," a list of free spaces with sufficient room for storing the particular record or object being inserted. In effect, contention for the last page is avoided by having inserts occur "all over," depending on where there is sufficient room. That approach, however, incurs an overhead penalty for the cost of maintaining this additional free space information, together with the cost of processing or acting on that information. Performance-critical systems often do not have the luxury of incurring such overhead. In such systems, the remaining choice is to append, that is, to grow at the end. Moreover, those systems which implement a free space list will ultimately still have to append to the end when free space has been exhausted.

Another approach to avoiding contention for the last page is to employ row-level locking—that is, to just lock a portion of the last page. Here, the object which is being locked is not a page but just the portion (e.g., row) which is being inserted. Consequently, the last page is still available for multiple inserts (e.g., of other rows on that page) by other inserters. Each inserter is only locking the particular row into which it is performing the insert. Essentially, this approach attempts to solve the problem by changing the granularity of the lock to a finer level of granularity. As with the free list approach, however, the row-level locking approach incurs significant overhead of performing the row-level locking mechanism. Accordingly, it does not necessarily overcome the disadvantages attendant with the free list approach.

All told, the computational expense of either of the above approaches makes each unattractive. Not only must additional information be maintained but it must also be processed during a time-critical phase of operation, such as the posting of transactions. Moreover, those approaches require a re-design of core data structures for implementation, thereby complicating the task of maintaining compatibility with prior versions of a given system (i.e., creating undesired upgrade issues).

What is needed are system and methods which reduce or eliminate contention in the instance of multiple appenders. Such a system should maintain performance, particularly during time-critical phases of system operation. Further, such a system should preferably not create incompatibility with existing systems. The present invention fulfills this and other needs.

SUMMARY OF THE INVENTION

The present invention comprises a Client/Server Database System with improved methods for appending items to an object, such as appending data records to a database table, in the context of a multi-user environment. In an exemplary embodiment, the system includes one or more Clients (e.g., Terminals or PCs) connected via a Network to a Server. The Server, operating under a server operating system (e.g., UNIX) includes a Database Server System, such as Sybase SQL Server™. In general operation, Clients store data in and retrieve data from one or more database tables resident on the Server by submitting SQL commands, some of which specify insert or append operations, for appending records to a table.

For enhancing the speed in which the Database Server appends records, the operation of the server is modified to store an object (e.g., table) as multiple (physical) page chains. From the logical viewpoint, a single (logical) page chain of data pages is presented to each client or user. Since a single logical view is provided, the entire mechanism remains transparent to clients. In a table scan, for instance, the client only knows that a particular page chain is being traversed for the scan. What the client is unaware of, however, is that there are actually multiple physical page chains. In operation, one physical page chain or "slice" is scanned then stopped, then another physical page chain or slice is scanned then stopped, and so forth and so on. From the perspective of inserting records, on the other hand, the system has multiple page chains to insert into. In other words, from the point of view of inserting records, there are multiple buckets. From the point of view of scanning, however, there is but a single bucket.

In addition to removing contention for the last page, contention for the data structure in the system catalog which provides access to the last page is also removed. Performance benefits cannot be realized if the block which typically occurs is simply moved from a block occurring at the last page to a block occurring during lookup of the system catalog. Accordingly, the system of the present invention includes one data structure per slice or partition which maintains the system catalog information for the particular slice. Just as the bottleneck is removed on the last page, the bottleneck is removed on the information which describes where the last page is. In an exemplary embodiment, this is done by use of a "control page" for each partition. In this fashion, each physical page chain has a single control page associated with it which describes where the last page is (in addition to other allocation information) for the particular page chain.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of append performance is desirable, including non-SQL database management systems and the like. The description of the exemplary embodiments which follows is, therefore, for the purpose of illustration and not limitation.

Standalone System Hardware

Figure 1A:
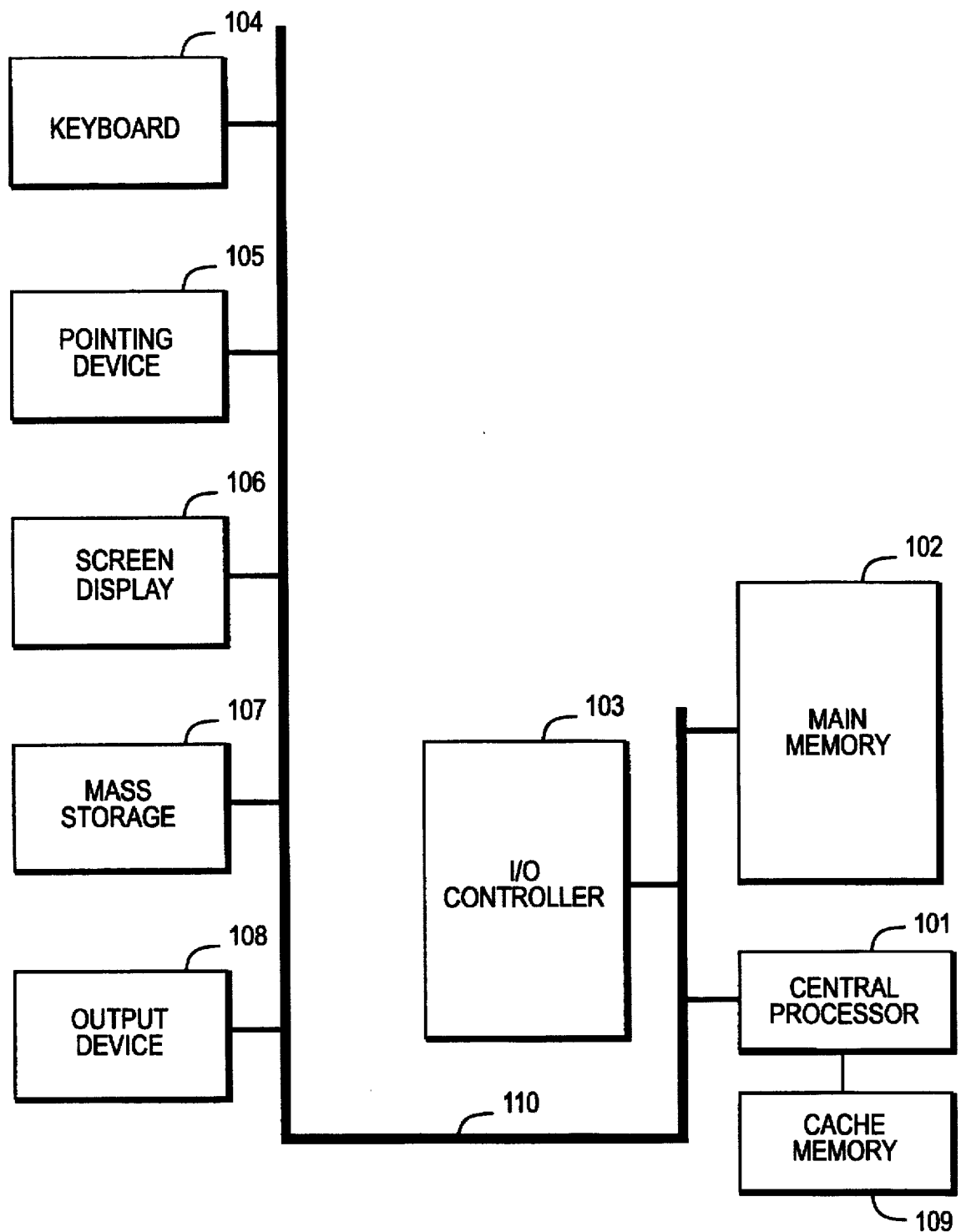
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
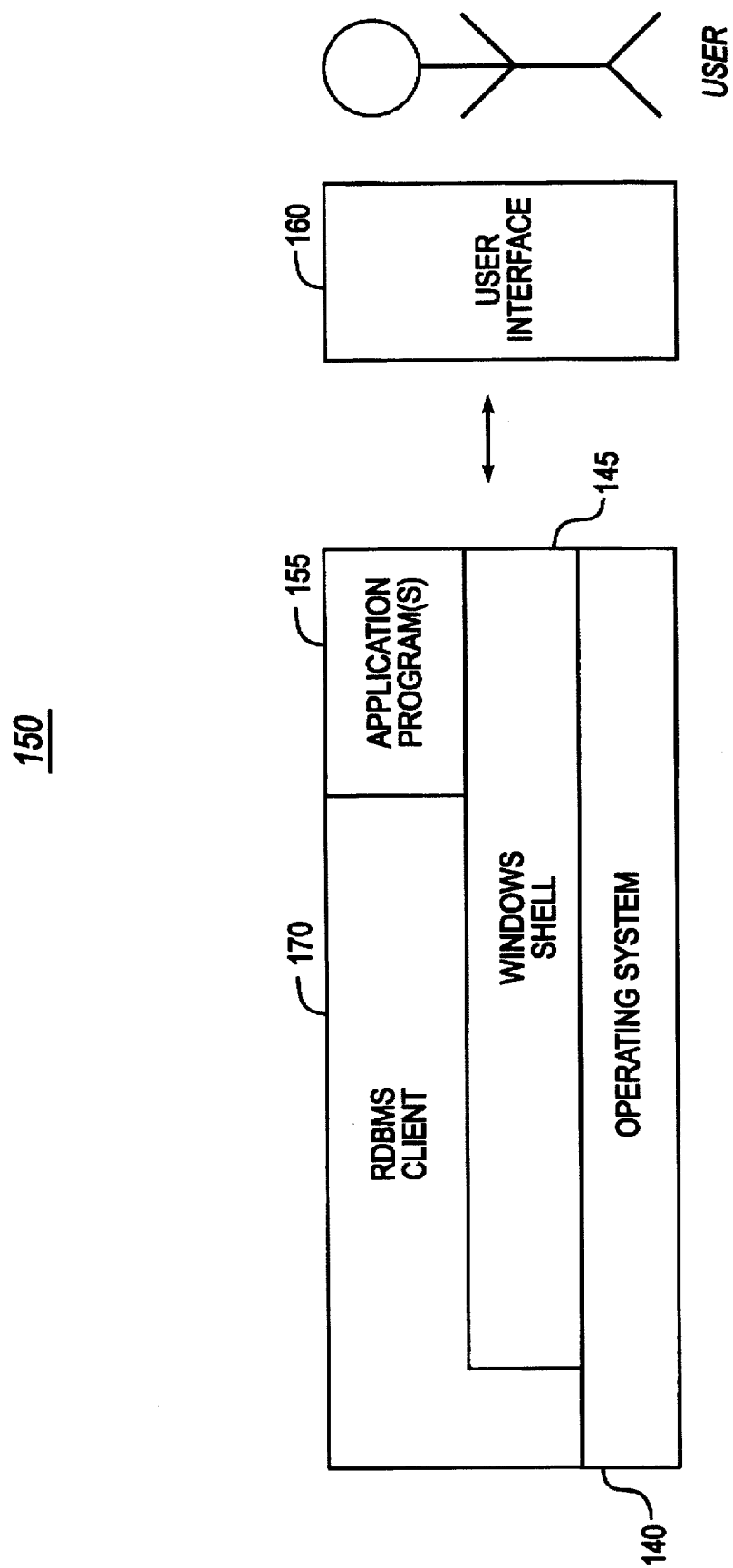
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing database tables from a SQL database server operating in a Client/Server environment.

Client/Server Database Management System

Figure 2:
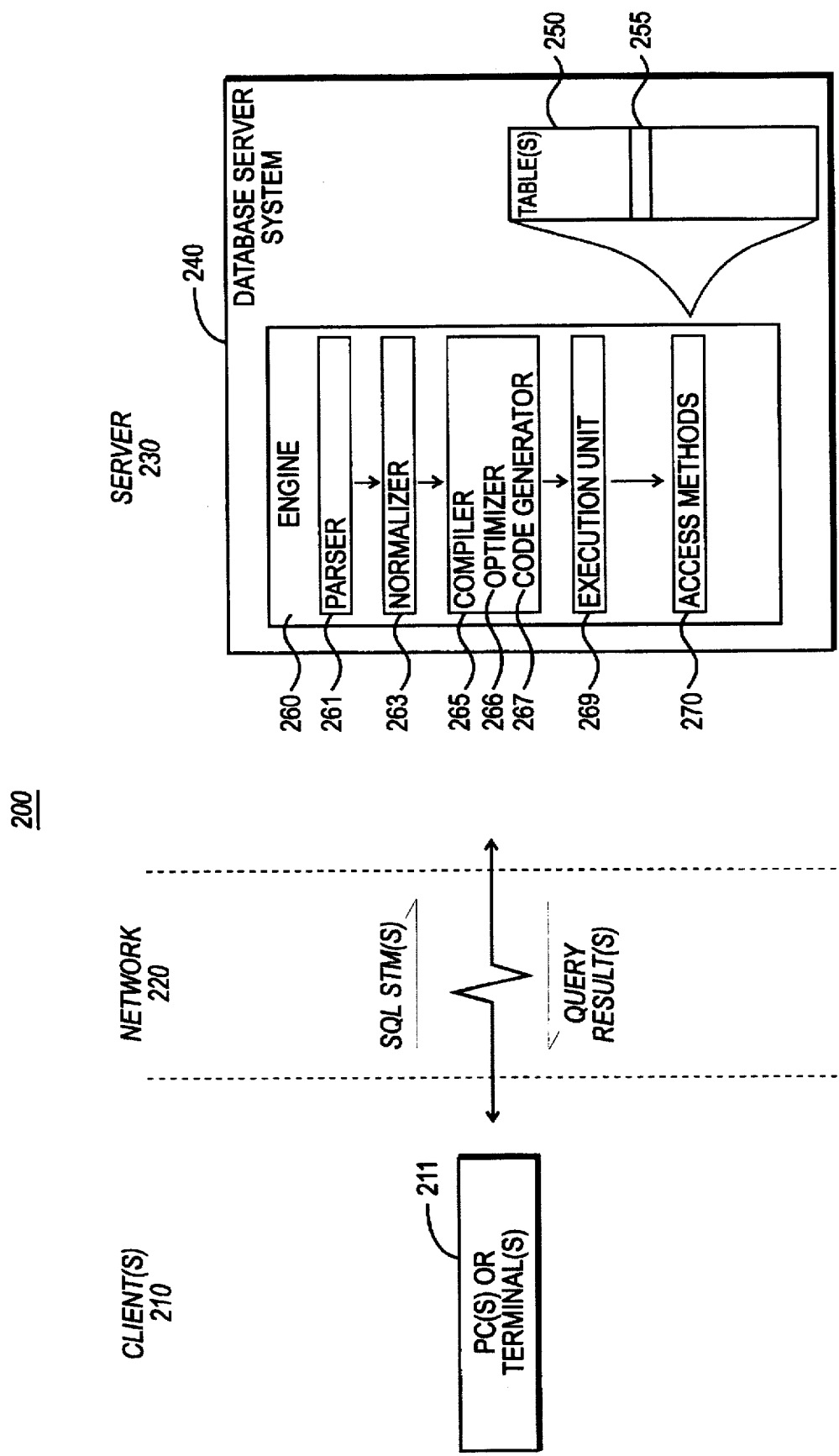
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), UNIX (Novell), or OS/2 (IBM). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. Alternatively, instead of storing unique record numbers, a "clustered" index may be employed. This is an index which stores the data pages of the records themselves on the terminal or leaf-level nodes of the index.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

Optimizing Multiple Insertions by Multiple Clients

A. Introduction (1) Page Chain

According to the present invention, operation of the database server is modified to store objects as multiple (physical) page chains. Before describing this in further detail, it is first instructive to briefly review the nature of how objects, such as tables, are generally stored as a "page chain."

Figure 3A:
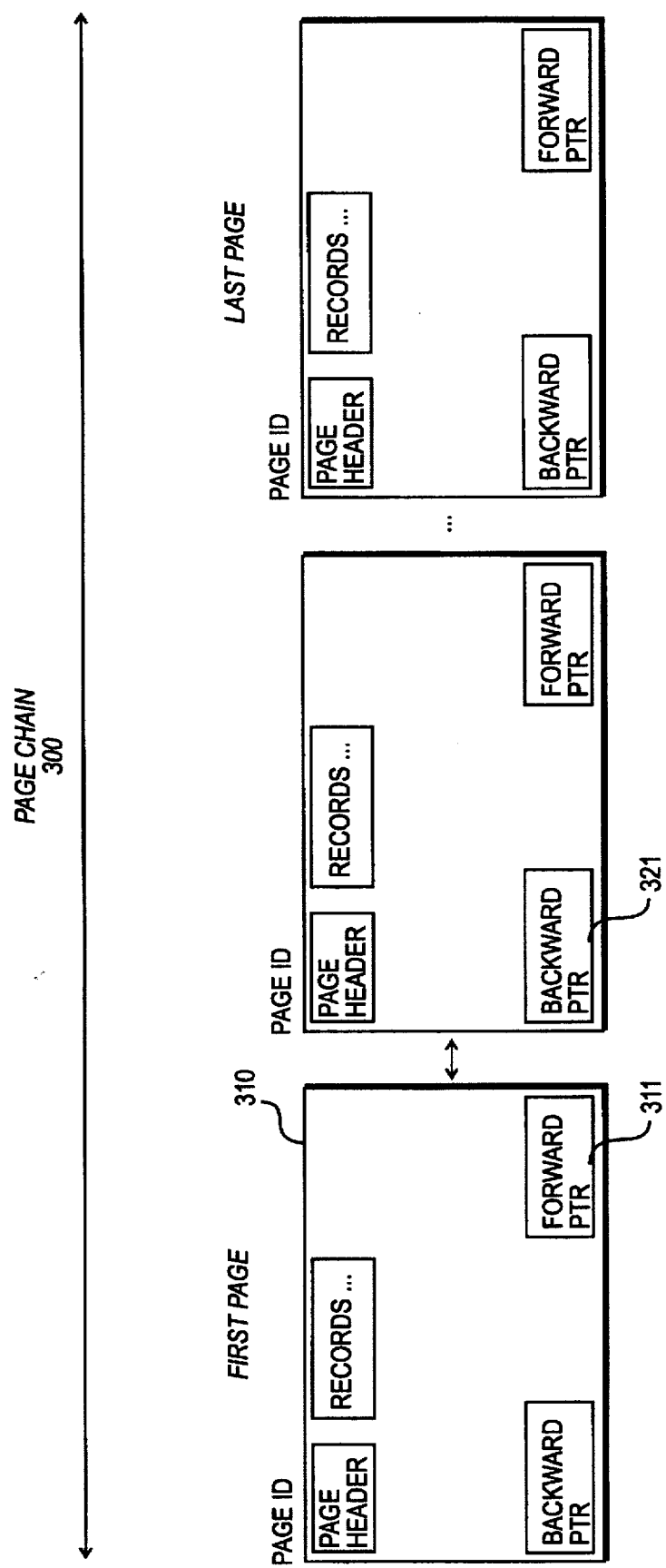
FIG. 3A is a block diagram of a page chain which comprises a chain of data pages.

As shown in FIG. 3A, the data records or rows of a database table are actually stored in a particular structure known as a data page. A data page may be viewed as a storage unit (e.g., 2K storage block) which holds one or more records, such as page 310. When a data page is "full," typically on the order of about 50 to 100 records, it is necessary to allocate a new data page. Every page which is allocated is linked to its previous and next neighboring pages via forward and backward page pointers (e.g., pointers 311, 321), so that logically a chain (linked list) of (physical) pages exists. This forms the "page chain," such as the page chain 300 shown in FIG. 3A. Typically, identifiers or "Page IDs" for the first and last page of a page chain are maintained in a system catalog.

In situations where it is desired to add a record to the end (i.e., append), the system simply looks up the last page in the system catalog, finds the page, and then performs an insert there. If insufficient room exists on the last page, the system allocates a new page, links it into the page chain, and updates the system catalog. In SQL Server™, for instance, only a single page chain is employed for a given object. As a result, contention for the last page arises in the instance of multiple appenders. With this basic understanding of the notion of a page chain, one may now better appreciate multiple page chains as taught by the present invention.

(2) Multiple Page Chains

Figure 3B:
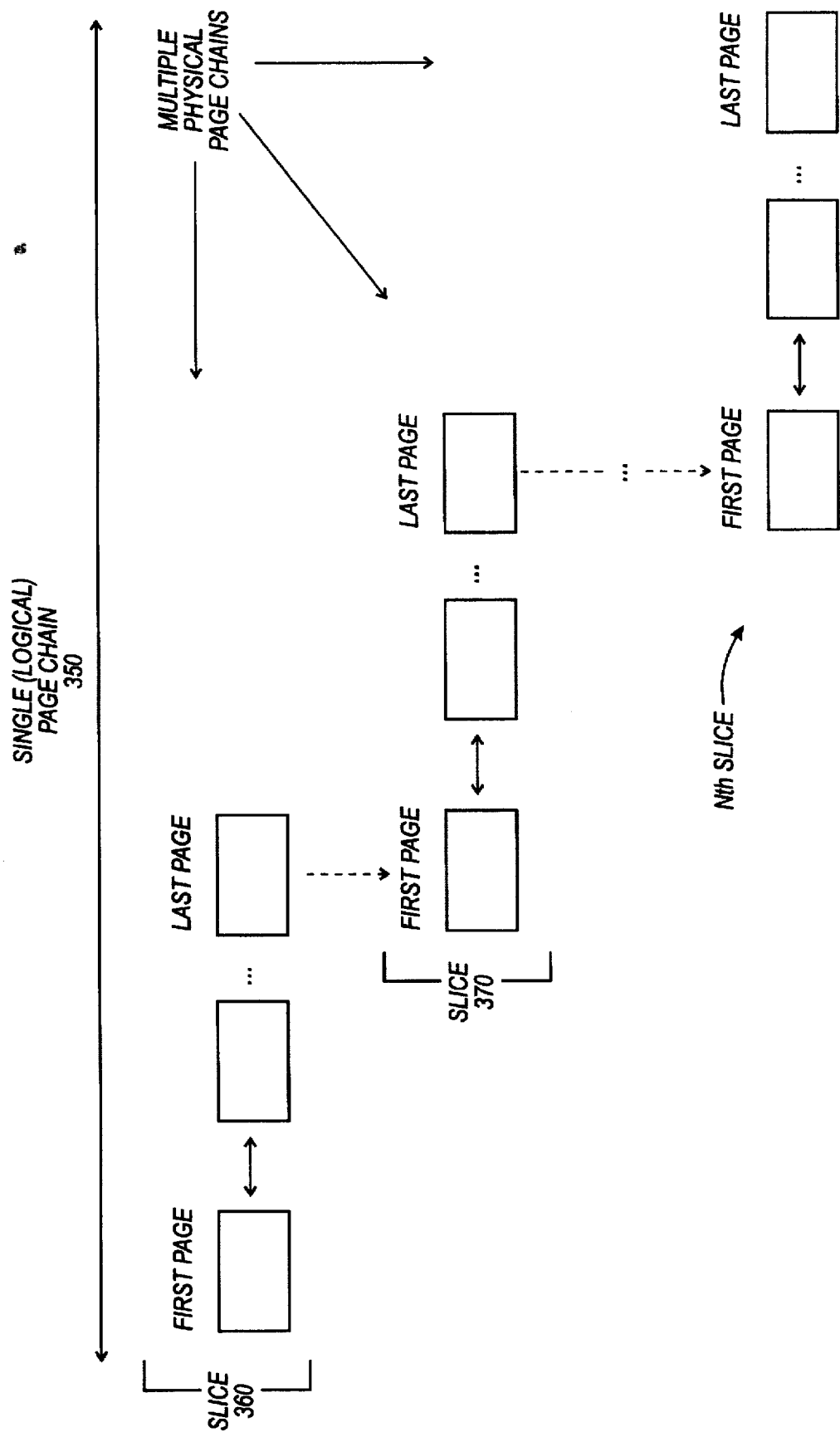
FIG. 3B is a block diagram of a single (logical) page chain of the present invention which comprises multiple physical page chains.

In the system of the present invention, multiple page chains are created for an object; the exact number of which is user configurable. This is illustrated in FIG. 3B. From the logical viewpoint, a single (logical) page chain 350 is presented to the client or user. Since a single logical view is provided, the entire mechanism remains transparent to clients. In a table scan, for instance, the client only knows that a particular page chain is being traversed for the scan. What the client is unaware of, however, is that there are actually multiple physical page chains (e.g., 360, 370). In operation, one physical page chain or "slice" (e.g., 360) is scanned then stopped, then another physical page chain or slice (e.g., 370) is scanned then stopped, and so forth and so on. From the perspective of inserting records, on the other hand, the system has multiple page chains to insert into. In other words, from the point of view of inserting records, there are multiple buckets. From the point of view of scanning, however, there is but a single bucket.

B. System Components

Figure 4:
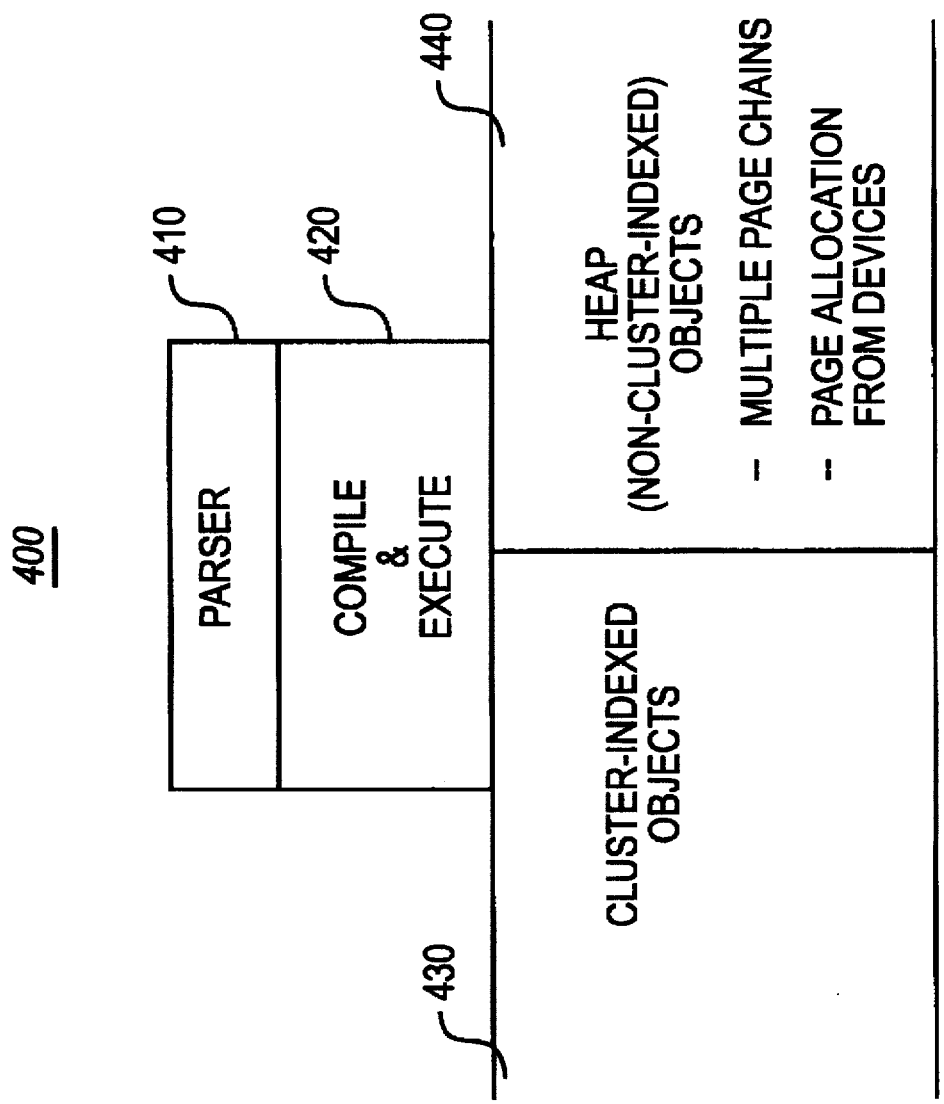
FIG. 4 is a block diagram of a Database Server System shown in simplified form.

FIG. 4 shows a block diagram of a Database Server System 400, shown in simplified form for the purpose of the following detailed discussion of implementing the present invention. From a simplified perspective, Database Server 400 includes a Parser 410 and a Compile and Execute Unit 420. The Parser 410 parses SQL commands received from clients into an intermediate representation suitable for processing by the Compile and Execute Unit 420. Taking the user query, the Compile and Execute Unit 420 generates and then executes a query plan. The Parser 410 and the Compile and Execute Unit 420 are those parts of the server which "understand" SQL.

Below the Parser 410 and the Compile and Execute Unit 420, the system may be viewed in terms of modules or components of the server which manage objects—that is, core services of the server for managing the objects in the system. Unlike the SQL components (i.e., Parser 410 and Compile and Execute Unit 420), these core service modules are not necessarily relational aware. These latter modules include knowledge about storing and retrieving objects in a generic sense, such as fetching a particular data page which includes a row satisfying a given predicate.

Core services may be divided on the basis of two object types in the system: clustered-index objects 430 and non-clustered-index objects 440. Recall that the primary object dealt with in a database server system is a table, more particularly a table comprising multiple rows; or, more generally, an item which includes multiple subitems. In a relational database system such as Sybase SQL Server, the two key kinds of objects in the system are objects with a clustered index and objects that do not have a clustered index (i.e., heap objects).

The distinguishing feature between clustered-index objects and non-clustered index objects is the way in which inserts into the object are performed. An object which has a clustered index on it has the property that inserts into the object will be, generally, predetermined. In a clustered index, data pages are stored on the leaf-level nodes of the index, as opposed to a conventional index which merely stores record pointers at its leaf-level nodes. An INSERT operation into a clustered index object, therefore, occurs at the particular data page at the position corresponding to the key value (i.e., index position) for the record being inserted. In other words, data pages for clustered-index objects are already sorted, since each particular page is placed at a given leaf-level node. Inserts into such objects, therefore, must occur at the appropriate page for the index position or key value for the item being inserted. In a clustered index object, therefore, the clustered index dictates which page a given item will be inserted into.

In a heap object, in contrast, no such phenomenon exists. As a result, all inserts go to the end—the last page of the heap. The last page is continually changing as each preceding last page runs out of room for the insert. Heap objects typically comprise objects employed in an append-only fashion. In financial applications, for instance, an audit trail (i.e., sequential log of all debits and credits) is a heap object. Another example includes an order entry system. There, the data objects comprise a sequence of orders (e.g., by order number) which are continually entered into the system. Heap objects, therefore, include data items which represent an ordered log, a history, or the like. Generally, these are objects which are not searched on or queried. For objects which are generally searched on or queried, particularly in systems supporting clustered indexes (e.g., Sybase SQL Server), append-only structures are generally not used. Nevertheless, heap objects may have indexes defined on them. Such indexes, however, include record pointers at the terminal or leaf-level pages of the index; they do not contain the data records themselves. Heap objects have the distinguishing feature that they do not comprise pre-sorted storage slots which dictate how records are inserted.

C. Implementing Multiple Last Pages for Insertion

Two aspects emerge. The first is the aspect of creating multiple last pages, by creating multiple page chains. The second aspect is to perform the allocation for the last page in such a way that a particular page chain is maintained on a single physical device, so as to maintain I/O (input/output) performance. The placement or mapping of a physical page chain to a particular device will, in a preferred embodiment, depend on how the user has configured the system, particularly how many devices are available for storage of this object (i.e., table). If the system has as many (or more) storage devices as physical page chains, the invention will exploit those devices so as to maximize I/O performance. Thus in addition to providing multiple insert points, the system adds parallelism to I/O operations.

One design consideration, therefore, is to allow the user (client) to configure however many page chains that are desired. Each page chain serves as a "partition" or "slice" of an object which would otherwise be stored as a single page chain. Since scans are not stopped at partition boundaries, the full table view is preserved. Hence, implementing the present invention includes resolving issues relating to: (1) How does one create multiple page chains? (2) How does one provide efficient access to the last page of a specific page chain? (3) How is transition from one page chain to another (e.g., during table scan) accomplished in a manner which is transparent to clients?

From the user's point of view, two aspects are surfaced. First, the user can configure which object resides on which devices. For instance, the user may specify that Table T1 resides on devices D1, D2, and D3. This aspect (i.e., indicating device affinity) has existed in the database system prior to multiple page chains. Second, additional syntax is added (i.e., SQL syntax) to ALTER a table to comprise a certain number of partitions. Upon learning how many partitions a table should have and how many devices the table is mapped to, the system will carry out steps for mapping particular partitions to particular devices, in essence fitting the number of partitions into available devices. There is no syntax change, however, for INSERT, DELETE, UPDATE, and SELECT operations. Since these operations are unchanged, the multiple page chains operate transparently to the clients.

From the relational model point of view, rows can be returned in any order. Typically, given a single page chain and knowledge that the server is only appending at the end, one might be tempted to infer that when the table is scanned the records will be returned in the same order that they were inserted. Such an assumption, however, is specifically disallowed by the relational model. This aspect may be exploited as follows. The system of the present invention can insert records into any partition, yet not be concerned about the return order of a table scan (since user assumptions about a particular return order are disallowed). In those instances where the user desires a specific order, the user may add an ORDER BY CLAUSE to the query; the system will, in that case, undertake necessary steps for returning the records in a particular order.

Another important design consideration is efficient access to the last page. In addition to removing contention for the last page, contention for the data structure in the system catalog which provides access to the last page is also removed. In other words, it is not helpful to remove contention for the last page if there continues to be contention for the means for determining the last page (i.e., the control page in the system catalog which tracks the last page). Clearly, performance benefits cannot be realized if the block which occurs is simply moved from a block occurring at the last page to a block occurring during lookup of the system catalog. Accordingly, the system of the present invention includes one data structure per partition which maintains the system catalog information for the particular partition. Just as the bottleneck is removed on the last page, the bottleneck is removed on the information which describes where the last page is. In an exemplary embodiment, this is done by use of a "control page" for each partition. In this fashion, each physical page chain has a single control page associated with it which describes where the last page is (in addition to other allocation information) for the particular page chain.

Internal Operation

A. Overview

Figure 5:
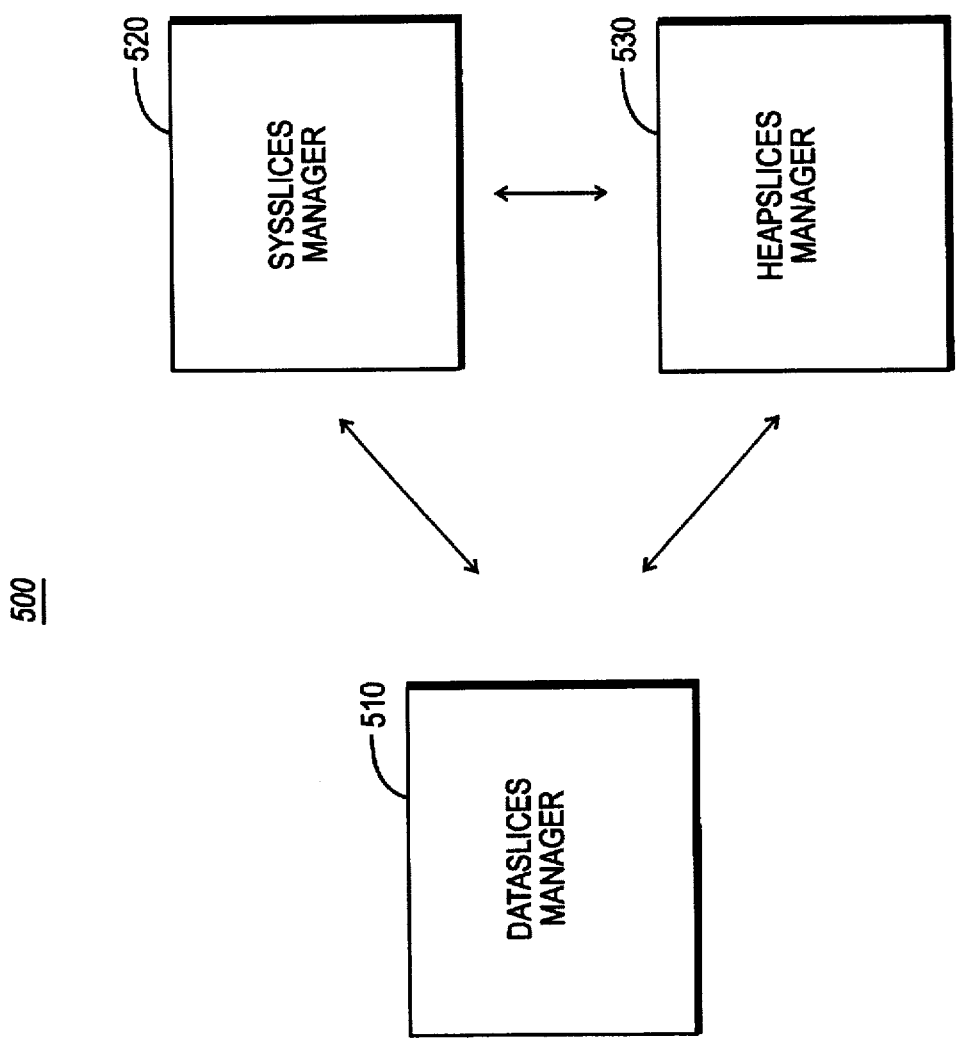
FIG. 5 is a block diagram of functional modules of the present invention: a Dataslices manager, a Sysslices manager, and a Heapslices manager.

As shown in FIG. 5, functionality for the present invention is implemented in three modules: Dataslices 510, Sysslices 520, and Heapslices 530. The Dataslices module or manager 510 provides an interface by which other modules of the system request partitioning or "slicing" of a table—that is, it provides entry points for creating and destroying a sliced table. In this manner, it encapsulates the general functionality of slicing. This interface or API (Application Programming Interface) is surfaced to other modules of the system, such as the Parser (Parser 410 of FIG. 4). When the Parser encounters an ALTER table statement with a partition clause, for instance, the Parser will call the Dataslices module or manager 510 for performing the task of slicing.

The Dataslices manager will, in turn, call on to the Heapslices manager 530 to actually create the control pages and set up the page chains. The Dataslices manager calls the Heapslices manager on a per partition basis, for carrying out this functionality. Additionally, the Heapslices manager will determine which device(s) the object will reside on. On a per partition basis, the Heapslices manager creates a mapping for determining which page is preferentially allocated-from when the system needs to extend a particular partition. This map is also stored on the corresponding control page. Accordingly, given a control page, the system can readily determine which pages it should preferentially allocate from. This allocation is "preferential" in the sense that, on occasion, a particular device might exhaust its available pages. The system therefore first looks to its list of preferential pages and if those are exhausted it will, only then, go to another device to allocate a page.

The Sysslices manager 520 is added as a further enhancement to the system. In order to further improve performance, memory structures are created which keep the same information as the control pages. This allows the system to avoid re-reading the control page for instances where the last page has not changed. The Sysslices manager, in essence, maintains a cache of the data structures which characterize the object. In this role, the Sysslices manager includes functionality for keeping the information in cache in sync with the corresponding information maintained on disk (i.e., maintain coherency). When updates are made to disk, for instance, the changes are logged with the Sysslices manager 520.

Since the INSERT syntax itself remains unchanged (i.e., from the client's point of view), choice of a particular partition is picked at random to perform an insert. Given an INSERT statement to process, the Dataslices manager invokes randomization steps for selecting a partition at random. Throughout the duration of the transaction, the Dataslices manager uses that particular partition whenever an insert occurs for the table (i.e., always insert into that partition which has been obtained).

The benefit of this approach is that the system is only holding a lock on a single partition, not multiple partitions. If, instead, the system chose a random partition for each insert, it could potentially block all of the last pages for the partitions. In the cache maintained by the Sysslices manager, information describing which particular partition is currently being used by a transaction is stored. The cache may indicate, for instance, that a particular transaction is using partition #3. During the duration of the transaction, the system will always perform inserts into partition #3. The next partition might choose partition #7; all inserts for that transaction are placed into partition #7. Randomization is therefore used, in a preferred embodiment, to control which partition to insert into. Alternatively, a partition may be selected in a round-robin manner or other selection scheme, as desired. Once a partition is chosen for a particular transaction, however, subsequent inserts during that transaction are placed into the selected partition. In this manner, contention can be avoided.

B. Dataslices Manager

The Dataslices manager operates at the level of the object, such as slicing and unslicing a table. In addition to encapsulating functionality for partitioning/unpartitioning, the Dataslices manager also encapsulates functionality for treating an object as a single page chain. For instance, the manager handles the task of getting the next page (of a single logical page chain). Recall that multiple physical page chains are represented as a single logical page chain view. The methodology for retrieving the next page from the single logical page chain includes, therefore, steps for traversing physical page boundaries. This supports traversing multiple page chains for providing, in effect, the traversal of a single (logical) page chain.

The Dataslices manager also surfaces an API call for determining whether a table is "empty" (i.e., stores no records). Previously, in conventional systems, it was easy to determine whether a table was empty. Such systems need only look at a single page chain for making this determination. In the system of the present invention, however, it does not suffice to examine just one single (physical) page chain. The fact that one particular partition or physical page chain is empty does not necessarily indicate that other physical page chains of the object are empty. The system must, instead, look at all the partitions for the table. Accordingly, the Dataslices manager surfaces an API which allows other modules of the system to invoke methods to look at all the partitions for determining whether a table is empty.

C. Heapslices Manager

In contrast to the Dataslices manager which performs partitioning on an object or table basis, the Heapslices manager performs partitioning on a per partition basis—that is, one partition at a time. If, for example, the Dataslices manager receives a request to create five partitions for a table, it will make five calls to the Heapslices manager for carrying out the task. For creating a slice or partition, the manager invokes steps for creating a control page and maintaining the information about the last page. In a corresponding manner, the manager also includes method steps for destroying a slice by removing a control page and the information about the last page.

In addition to methods for creating and destroying partitions or slices, the Heapslices manager includes methods for opening and closing slices. Before a slice is used, it must be "opened." This is the task of performing housekeeping operations for preparing the slice. The end result is the return of a handle or pointer which permits further operations on that slice. In a complementary manner, the methods for "closing" a slice perform housekeeping operations necessary for removing the slice from use, including steps for invalidating the handle or pointer which was returned upon opening the slice. The Heapslices manager also includes methods for choosing a particular slice for inserting records into, including steps for randomly selecting a partition. Finally, the Heapslices manager includes methods for allocating a new page for a particular page chain whose last page has run out of room.

D. Sysslices Manager

The Sysslices manager includes methods for inserting and deleting rows in a system table, named SYSPARTITIONS. Since each partition is represented in the system catalog, methods are provided for inserting a row in the system catalog and deleting a row from the system catalog. The Sysslices manager also includes methods for altering specific values in the cached information. This is done by a specific routine since it must be spin locked, to prevent alteration by other concurrent clients which might be attempting to read or write the same information.

The Sysslices manager includes methods for getting a pointer or handle to the next slice, during a table scan. In such an instance, the old cache information is discarded and refreshed with the information for the new slice. In general, therefore, when the system is positioned on a particular partition, the information for that partition is maintained in cache. The Sysslices manager serves, therefore, to synchronize the cache with the current partition in use.

E. Detailed Construction of the Modules

The Dataslices manager 510 includes methods or routines providing a general interface to heap memory partitioning functionality. At the outset, it is helpful to examine the data structures which the methods employ. An xdes data structure is defined for storing information relevant to a transaction; thus, it serves as a "transaction descriptor." As will be noted below, many of the methods are invoked with a pointer to an xdes data structure for the then-current transaction. Since the work which is to be performed occurs within the context of a particular transaction, the xdes data member is helpful for encapsulating information which needs to be maintained on a per transaction basis.

In an exemplary embodiment (constructed using the C programming language), an xdes data structure may be defined as follows:

```
1:  /* XDES: */
2:  /*
```

```
 3: ** The XDES has xslgroup field whose purpose is to temporarily
 4: ** hold any SLGROUPs to be freed till eot. When table unsliced, the
 5: ** SLGROUPs to be released are moved from the DES to XDES.xslgroup.
 6: ** If the transaction commits, move this list of released SLGROUPs
 7: ** to the global free list. If the transaction aborts, we move the
 8: ** SLGROUPs back to the DES. This provides convenient and safe way
 9: ** of managing the SLGROUPs.
10: */
11:
12: typedef struct xdes
13: {
14:
15:     XLRMARKER    xindir;           /* ptr for indirect updating */
16:
17:     struct sdes  *xupdate;         /* sdes pointer for updated table */
18:     int32        xstate;           /* state */
19:     short        xstatus;          /* status bits */
20:     short        xmode;            /* type of update */
21:
22:     /* relevant to slices. */
23:     int          xpost_commit_work;
24:                                    /* Is there post commit work? */
25:
26:     /*
27:      ...
28:      */
29:
30:
31:     /* relevant to slices. */
32:     int32        xslicehashval;    /* used to choose a slice number
33:                                    ** while inserting into sliced
34:                                    ** table. See hsm_strategy().
35:                                    */
36:     struct xxs   *xxs;             /* XLS state information */
37:
38:
39:     /* relevant to slices. */
40:     struct slgroup   *xslgroup;    /* SLGROUPs to be freed at eot */
41:
42:     /*
43:      ...
44:      */
45:
46:     DATE         xstarttime;
47:     spid_t       xspid;            /* spid of user */
48:     short        xnlen;            /* length of the transaction name */
49:     BYTE         xname[MAXXACTNAME]; /* the name of transaction. */
50:
51: }XDES;
```

Of the data members contained within the xdes data structure, two are of particular interest: xpost_commit_work and xslgroup. When a table is unpartitioned, some work remains to be done (e.g., memory de-allocation) after the transaction has committed. Accordingly, xpost_commit_work is employed as a boolean for indicating whether there is any post-commit work remaining to be done. If the boolean is set, at the end of the transaction, the system will examine the field xslgroup for determining a list of SLGROUPS (i.e., cache groups) which can be placed on the global free list.

Another data member relevant to Dataslices is xslicehashval, which is a 32-bit integer used to choose a random slice number for insertion. This is a property of the transaction (i.e., stored in xdes) since it is desired to repeatedly use the same slice throughout the duration of the transaction. In other words, the value is set at the beginning of the transaction and then repeatedly used throughout the duration of the transaction.

The next data structure of interest is sdes. The sdes data member serves as a session descriptor, for example, employed when accessing a database table. In an exemplary embodiment, the sdes data structure may be constructed as follows:

```
 1: /* SDES: */
 2: typedef     struct    sdes
 3: {
 4:     /*
 5:     ...
 6:     */
 7:
 8:     struct lockrec   *sscanlock;   /* lock on sscanbuf */
 9:     struct lockrec   *sdatalock;   /* lock on sdatabuf */
10:     struct      des *sdesp;       /* pointer to DES */
11:
12:     /*
13:     ...
14:     */
15:
16:     /* relevant to slices. */
17:     SLCACHE     *sslcacheptr;  /* current slice's cache descriptor */
18:     slnum_t     scurslice;  /* current slice. Used for scanning and
19:                              ** inserting into a sliced table.
20:                              */
21:
22:     struct sdes      *read_sdes;/* read session descriptor */
23:     int32            srestarts; /* # of times scan has restarted */
24:     BYTE             sstat2_vec[2];  /* more status bits */
25:     uint16               sshort_spare;    /* short spare */
26:     OBJ_STATS        sdes_stats;/* Structure to collect statistics */
27:     VS_STRATEGY      svs_strategy; /* virtual space strategy for scan */
28:     int32 sindlevel; /* leaf or non-leaf level of current scan */
29:     int              slkprom_lvl;   /* Lock promotion info */
30: } SDES;
```

The sdes includes a pointer to des which is a descriptor for a particular table object. The sdes stores housekeeping information, such as which record is currently locked, whether a scan is open, and the like. Of particular relevance to Dataslices is SLCACHE which serves as a descriptor to the current slice's cache. Stored in conjunction with this is slnum_t, which is the number of the slice this transaction is currently positioned on.

With an understanding of the relevant data structures, the methods of the Dataslices manager may now be understood. The Dataslices manager includes a method, dsm_slice_table, which slices a table by creating (N-1) new slices, where N is the number of slices for the table. The existing page chain of the table is assigned to the first slice. The page chain for each slice, except for the first slice, contains only one page which is the first and last page of the chain. All existing rows of the table belong to the first slice. In addition, a control page is created for each slice.

In an exemplary embodiment, the dsm_slice_table method may be constructed as follows:

```
1:  /*
2:  **    dsm_slice_table
3:  **
4:  **    Parameters:
5:  **         xdes          - (I/O) Transaction descriptor
6:  **         sdes          - (I/O) Session descriptor of the table
7:  **         slicenum      - (I/P) # of slices to create. Must be > 1
8:  **
9:  **    Returns:
10: **         SM_SUCCESS    - Successfully sliced the table.
11: **         other status         - Failure status (see slice.h for values)
12: **
13: **    Side Effects:
14: **         A new row for each slice is inserted into syspartitions
15: **         system table.
16: **
17: **    Assumptions:
18: **         1.   The transaction must have taken an exclusive lock on the
19: **              table.
20: **         2.   Caller must have checked if it is legal to slice the table.
21: **              (for instance, this function should not be called to
22: **              slice a work table)
23: **
24: */
25:
26: smstatus_t
27: dsm_slice_table (XDES *xdes, SDES *sdes, slnum_t slicenum)
28: {
29:      INDEX        indstruct;     /* sysindexes row for the table */
30:      int16        segid;         /* table's segment id */
31:      int32        devcount;      /* # devices segment mapped to */
32:      uint32       devmap [MAXVIRT];
33:      smstatus_t   status;        /* of slicing operation */
34:      slnum_t      i;             /* slice number */
35:
36:      /*
37:      ** First, determine the segment number of this object by
38:      ** obtaining the sysindexes row (indid = 0) for the table.
39:      */
40:      ind_rowcopy (sdes, 0, &indstruct) ;
41:      segid = GETSHORT (&indstruct.indsegment) ;
42:
43:      /* Build the device map for the segment */
44:      devcount = hsm_map_objdev (segid,
45:                      sdes->sdesp->ddbtable, devmap) ;
46:      /* Create slices */
47:      for (i = 1; i <= slicenum; i++)
48:      {
49:           if ((status = hsm_create_slice (xdes, sdes, i, slicenum,
50:                                devcount, devmap) ) != SM_SUCCESS)
51:           {
52:                return status;
53:           }
54:      }
55:
56:      /* Created all slices successfully */
57:      return SM_SUCCESS;
58: }
```

As shown, the method is invoked with the previously-described data members, xdes and sdes; slicenum is simply the number of slices to create. The steps of the method are as follows. First, the method determines the segment number of the object by obtaining the sysindexes row for the table (lines 36-41). Each table is mapped to a certain segment in the database. Accordingly, all of the partitions for the table must be mapped to the same segment. The method begins, therefore, by determining which segment the table is mapped to. The information which is returned, a segment ID (segid), is then used to construct a device affinity map (lines 43-44). A device count is established at this point.

Now, the method is ready to create slices. This is done at steps 46-54, by establishing a "for" loop for processing each slice in turn (i.e., from the number 1 to the number of slices); the method calls hsm_create_slice to create the Nth slice. As shown, the information required to create a slice includes the previously-described xdes and sdes descriptors, the slice ID (i), the total number of slices (slicenum), total number of devices (devcount), and a list of devices or "device map" (devmap). A request to slice a table is, therefore, carried out by repeatedly invoking the create slice method. If the process succeeds, the method returns a success value.

The create slice method, hsm_create_slice, establishes an association between a heap object and a slice, and creates a page chain for the slice. Generally, the heap object (e.g., table) already exists (i.e., has at least one slice) before this method is invoked.

```
 1:  /*
 2:  **  HSM_CREATE_SLICE
 3:  **  Parameters:
 4:  **      xdes — ptr to the transaction descriptor.
 5:  **      sdes — a session descriptor ptr to the heap object
 6:  **          for which the slice is being created.
 7:  **      slnum — the slice number to create.
 8:  **      totalslices — total number of slices being created for
 9:  **          this object
10:  **      totaldevs — total number IO devices on which the
11:  **          the object can exist.
12:  **      devmap — ptr to a bit map of valid virtual devices
13:  **          for the object's segment.
14:  **
15:  **  Returns:
16:  **      Status.
17:  **
18:  **  Synchronization:
19:  **      The caller must have a table level lock.
20:  **
21:  **  Side Effects:
22:  **
23:  */
24:  smstatus_t
25:  hsm_create_slice(XDES    *xdes,
26:      SDES        *sdes,
27:      slnum_t     slnum,
28:      int32       totalslices,
29:      int32       totaldevs,
30:      uint32      *devmap)
31:  {
32:      SLCACHE     *slc;
33:      DES         *obj;
34:      INDEX       indstruct;
35:      INDEX       *indp;
36:      BUF         *bp;
37:      SLINFO      *info;
38:      SLGROUP     *head;
39:      pgid_t      firstpg;
40:      pgid_t      ctrlpg;
41:      pgid_t      lastpg;
42:      SLGROUP     *slg;
43:      int         slgcount;   /* Number of SLGROUPs needed. */
44:      VOLATILE SLICE_CRT_CPY  copy;
45:      SLICE_CTRLBLK   ctrlblk;
46:      SLICE_CTRLBLK   *ctrlblk_ptr; /* points into control page */
47:      SYBPARTITION    slice;
48:      SYBPARTITION    *slptr;
49:      BYTE        rowbuf[sizeof(SYBPARTITION)];
50:      SLICE_AFFTBL    afftbl;
51:      int32       offset;
52:      TALLY       tally;
53:
54:      /*
55:      ** Step 1: Allocate a first page if necessary. This requires
56:      ** the affinity map, so set it up here.
57:      */
58:
59:      /* Zero out the control block. */
60:      MEMZERO((BYTE *)&ctrlblk, sizeof(struct slice_ctrlblk));
61:
62:      /* Build the control page affinity map for this slice. */
63:      ctrlblk.scp_afftbl_count = hsm_build_slicemap(sdes, slnum,
64:                          totalslices, totaldevs,
65:                          devmap,
66:                          &afftbl);
67:
68:      /*
69:      ** If this is the first slice then count up the number of
70:      ** pages already allocated to this page chain. There is ALREADY
71:      ** a first page, so there is no need to allocate one.
72:      */
73:      if (slnum == 1)
74:      {
75:          /* Get the used page count for the heap (indid = 0) */
76:          tally_fetch(sdes, 0, &tally);
77:          ctrlblk.scp_alloccount = tally.t_usedpgcnt;
78:
79:          /* Remember first and last page of the original page chain */
80:          firstpg = obj->dslinfo.sd_slice1.sc_first;
```

```
 81:        lastpg = obj—>dslinfo.sd_slice1.sc_root;
 82:    }
 83:
 84:    else /* If not first slice, we need to allocate a first page. */
 85:    {
 86:        if ((bp = hsm___allocate(sdes, indp, 0, FALSE, &afftbl,
 87:                ctrlblk.scp_afftbl_count,
 88:            (int32 *)&ctrlblk.scp_afftbl_offset)) == (BUF *)NULL)
 89:        {
 90:            ex_raise(SLICEMGR, 0, EX_CONTROL, 1);
 91:        }
 92:
 93:        firstpg = bp—>bpage—>ppageno;
 94:        lastpg = bp—>bpage—>ppageno;
 95:
 96:        ctrlblk.scp_alloccount = 1;
 97:
 98:        /* unkeep the first page buffer */
 99:        bufunkeep(bp, sdes);
100:    }
101:
102:    /* Step 2: Allocate a control page. */
103:
104:    if ((bp = hsm___allocate(sdes, indp, firstpg, TRUE, &afftbl,
105:            ctrlblk.scp_afftbl_count,
106:        (int32 *)&ctrlblk.scp_afftbl_offset)) == (BUF *)NULL)
107:    {
108:        ex_raise(SLICEMGR, 0, EX_CONTROL, 1);
109:    }
110:
111:    /* Remember the control page id */
112:    ctrlpg = bp—>bpage—>ppageno;
113:
114:    copy.bp = bp;
115:
116:    if (!endupdate(xdes))
117:    {
118:        ex_raise(SLICEMGR, 0, EX_CONTROL, 1);
119:    }
120:
121:    /* Step 3: Insert a new row in SYSPARTITIONS */
122:
123:    /* Zero out the SYBPARTITION structure. */
124:    slptr = (SYBPARTITION *)&slice;
125:    MEMZERO((BYTE *)slptr, sizeof (SYBPARTITION));
126:
127:    /* format a row for syspartitions table. */
128:    slptr—>sl_slicenum = slnum;
129:    slptr—>sl_objid = sdes—>sdesp—>dobjectc.objostat.objid;
130:    slptr—>sl_first = firstpg;
131:    slptr—>sl_ctrlpg = ctrlpg;
132:
133:    fmtrow((int)SYSPARTITIONS, (BYTE *)slptr, (int *)0, rowbuf);
134:
135:    /* insert the row */
136:    sl_row_insert(xdes, rowbuf);
137:
138:    /*
139:    ** Step 4: Update the slcache. This involves allocating the
140:    ** SLGROUPS, if we are creating the first slice. In this case,
141:    ** allocate ALL the needed SLGROUPS.
142:    */
143:
144:    if (slnum == 1) /* Allocate the SLGROUPS */
145:    {
146:        /*
147:        ** Make sure that there aren't any SLGROUPS allocated to this
148:        ** DES. If there are any groups, they must be left here
149:        ** by mistake; release them.
150:        */
151:        if (sdes—>sdesp—>dslinfo.next != NULL)
152:        {
153:            hsm_free_slgroup(&(sdes—>sdesp—>dslinfo.next));
154:        }
155:
156:        /* Compute the number of SLGROUPs required. */
157:        slgcount = (totalslices + SLCACHE_COUNT - SL_COUNT_NORMALIZER)
158:                / SLCACHE_COUNT;
159:
160:        if ((sdes—>sdesp—>dslinfo.next = hsm_get_slgroup(slgcount)) ==
```

-continued

```
161:            (SLGROUP *)NULL)
162:        {
163:            /* We've run out of configured slgroups;
164:            ** raise error
165:            */
166:            ex_raise(SLICEMGR, SLICEMGR_NOSLGROUP,
167:                EX_RESOURCE, 1);
168:        }
169:    }
170:
171:    /* Step 5: Get the slcache and update it with correct values. */
172:    slc = slcache_des_get(sdes—>sdesp, slnum);
173:
174:    /* Initialize the SLCACHE to zero */
175:    MEMZERO((BYTE *)slc, sizeof (SLCACHE));
176:    /* Assign a spinlock for the slice,
177:    and initialize the other fields. */
178:    slc—>sc_spin = hsm_get_slicelk();
179:    slc—>sc_slicenum = slnum;
180:    slc—>sc_ctrlpg = ctrlpg;
181:    slc—>sc_root = lastpg;
182:    slc—>sc_first = firstpg;
183:
184:    if (slnum == 1)
185:    {
186:        sdes—>sslcacheptr = slc;
187:        sdes—>scurslice = slnum;
188:    }
189:
190:    /*
191:    ** Step 6:
192:    ** Write the control page info. to newly allocated control page.
193:    ** The control page has logged as well as un-logged data. The
194:    ** affinity map which is stored on the control page is not logged;
195:    ** every time the DES is instantiated, affinity map is re-created
196:    ** and stored on the control page. Okay since the affinity
197:    ** map does not change; on the other hand, if a new device is
198:    ** added, it will be included in the affinity map
199:    ** the next time the DES is instantiated.
200:    ** The other information on the control page IS logged — basically
201:    ** the items that change are the last page id and the number of
202:    ** page allocations for this slice.
203:    */
204:
205:    if (!beginupdate(xdes, sdes, XMOD_DIRECT, 0))
206:    {
207:        ex_raise(SLICEMGR, 0, EX_CONTROL, 1);
208:    }
209:
210:    ctrlblk.scp_magic = SLICE_CTRLPG_MAGIC;
211:    ctrlblk.scp_lastpage = lastpg;
212:    ctrlblk.scp_slicenum = slnum;
213:
214:    /* Move the device affinity info into the control page.
215:    ** This information is re-created every time the DES is
216:    ** instantiated. So, it is not logged. However, other info in
217:    ** control page is logged.
218:    */
219:    bufpredirty(bp);
220:
221:    offset = PAGEHEADSIZE + sizeof(struct slice_ctrlblk);
222:    MEMMOVE((BYTE *)&afftbl, (BYTE *)bp—>bpage + offset,
223:        sizeof(struct slice_afftbl));
224:
225:    /*
226:    ** Initialize the control block in the control page with valid
227:    ** values. Otherwise, the control page buffer contains zero
228:    ** values because the control page is newly formatted. Then an
229:    ** error AFTER the new_replace() below will cause undo to
230:    ** restore zero values into the control page buffer. Undo then
231:    ** uses the control page contents to restore proper values into
232:    ** in-memory SLCACHE structures which will lead to errors.
233:    */
234:    ctrlblk_ptr = (SLICE_CTRLBLK *) ((BYTE *)bp—>bpage + PAGEHEADSIZE);
235:    *ctrlblk_ptr = ctrlblk;
236:
237:    bufdirty(bp, sdes);
238:
239:    if (!(new_replace(sdes, bp, PAGEHEADSIZE, (BYTE *)&ctrlblk,
240:        sizeof(ctrlblk), XREC_CTRLPGMODIFY)))
```

```
241:    {
242:        ex_raise(SLICEMGR, 0, EX_CONTROL, 1);
243:    }
244:
245:    if (!endupdate(xdes))
246:    {
247:        ex_raise(SLICEMGR, 0, EX_CONTROL, 1);
248:    }
249:
250:    /* unkeep the buffer */
251:    bufunkeep(bp, sdes);
252:
253:    copy.bp = (BUF *)NULL;
254:
255:    /* Update the number of slices in the DES. */
256:    obj—>dslinfo.sd_numslices = slnum;
257:
258:    return(SM_SUCCESS);
259:
260: }/* end of hsm_create_slice */
```

The steps involved are as follows. As the first step, the method allocates and initializes the first page (lines 55–101). In particular, at line 63, the method invokes hsm_build_slicemap which builds a control page affinity map for the particular slice being constructed. This information indicates for the current slice what are the available devices. Since the available devices might not equal the number of slices, the method determines at this point the mapping between devices and slices. It is preferable to do this up front since the first page as well as the control page are allocated from that particular set of devices.

At lines 68–82, the method tests whether the current slice is the first slice. Recall that in order to partition a table, the table must have already been created (i.e., already has a first slice and already has a first page). The method tests at this point, therefore, if the current slice is the first slice; if so, then the first page has already been created (by create table routines). Instead at this point, the method simply keeps a count of how many pages exist for the first slice (i.e., the original unsliced table which is now going to be sliced). The call to tally_fetch, at line 76, gets the number of pages which are in the first slice. Also at this point (specifically lines 79–81), the method remembers the first and last pages of the original page chain. At a later point, the system will place that information in the control page.

If the current slice is not the first slice (i.e., false at line 73), then the method needs to allocate a first page for the current slice. This is done at lines 84–101. Specifically, this is done by the hsm_allocate method, at line 86, using the affinity map (afftbl) which was built by the call to hsm_build_slicemap. Specifically at this point, the method attempts allocation of the first page, with an affinity to the device(s) specified in the map. Again, the method remembers the first page and last page (lines 94–95) which here will be the same (since a brand new first page has just been created). At this point, there is exactly one page (noted at line 97). Once a first page is allocated, the method proceeds to the second step to allocate a control page (i.e., a page which is to contain this information), shown at lines 103–120. Regardless of whether the table object is previously partitioned or unpartitioned, a new control page is allocated at this point for storing information about the slice being created. The particular allocation is done at line 105, with a call to hsm_allocate. At the completion of this second step, the method is done with allocation of the two pages—a first page and a control page.

Now, the method is ready to add a new entry to the SYSPARTITIONS table, a catalog for tracking this information, as its third step. The SYSPARTITIONS table will contain, in particular, the first page ID as well as the control page ID. From the control page, the system can determine the page ID for the last page. The particular row entry is formatted at lines 128–134 and inserted at lines 136–137. In particular at line 137, the row is inserted into the SYSPARTITIONS table by a call to sl_row_insert. Since this is an insert operation, it is a logged operation. At this point, the first page and the control page have been created, an entry has been made in SYSPARTITIONS, and the operation has been logged. The method is now ready to create the in-memory (cache) structures for managing this slice. Allocation for the cache for all of the slices is done up front, that is during creation of the first slice, as the fourth step (lines 139–170).

The fifth step is to get the cache entry and update it with correct values (lines 172–189). At line 172, the call to slcache_des_get returns a pointer to the Nth slice. After initializing the entry to zero (line 176), a spin lock is assigned (line 179) and the remaining fields are updated with values for the slice (namely, slice number, control page ID, last page ID, and first page ID).

Finally, at the sixth step, the same information is installed on the control page (lines 191–252). Recall that this is done because the cache and the control page are maintained in sync. This information, as well as the device affinity map (i.e., which storage devices are mapped to this partition) are copied to the control page, particularly at lines 223–224. Once the information has been copied, the control page is flushed to disk (by marking it dirty at line 238). The method concludes by updating the number of slices in the des descriptor. Finally, it returns, with a status flag indicating "success" (at line 259).

Complementing dsm_slice_table is dsm_unslice_table, the method for unpartitioning a table. The primary functionality achieved by this method is to unslice the table by concatenating the page chains into one page chain. The method starts at the end: for N number of slices, the method begins at the Nth slice. The Nth slice is concatenated with the N−1 slice, then with the N−2 slice, and so forth and so on until a single page chain view of the table is completed.

In an exemplary embodiment, the dsm_unslice_table may be constructed (using the C programming language) as follows:

```
1:  /*
2:  **  dsm_unslice_table
3:  **
4:  **  Parameters:
5:  **      xdes        - (I/O) Transaction descriptor
6:  **      sdes        - (I/O) Session descriptor of the table
7:  **
8:  **  Returns:
9:  **      SM_SUCCESS  - Successfully unsliced the table
10: **      other status            - Failure status (see slice.h for values)
11: **
12: **  Side Effects:
13: **      Rows of the slices of the tbale are deleted from syspartitions
14: **      system table.
15: **
16: **  Assumptions:
17: **      1.  The transaction must have taken an exclusive lock on the
18: **          table.
19: **      2.  The table must be a sliced table.
20: **
21: */
22:
23: smstatus_t
24: dsm_unslice_table (XDES *xdes, SDES *sdes)
25: {
26:     slnum_t     slicenum;   /* number of slices */
27:     slnum_t     i;          /* slice number */
28:     smstatus_t  status;     /* of unslicing operation */
29:
30:     /* Get the total number of slices for the table */
31:     slicenum = SDES_NUMSLICES (sdes) ;
32:
33:     /*
34:     ** Destroy slices starting from last to second. When a slice
35:     ** is destroyed, its page chain is concatenated with the
36:     ** previous page chain.
37:     */
38:     for (i = slicenum; i > 1; i--)
39:     {
40:         if ((status = dsm_destroy_slice (xdes, sdes, i) ) != SM_SUCCESS)
41:         {
42:             return status;
43:         }
44:     }
45:
46:     /*
47:     ** Now, the first slice's control page needs to be freed. Call
48:     ** HSM to destroy the first slice. The page chain is not really
49:     ** destroyed. HSM treats first slice as a special case.
50:     */
51:     if ((status = hsm_destroy_slice (xdes, sdes, 1) ) != SM_SUCCESS)
52:     {
53:         return status;
54:     }
55:
56:     /* Table has been successfully unsliced */
57:     return SM_SUCCESS;
58: }
```

The specific steps are as follows. First, the method gets the total number of slices for the table (lines 30–31). Next, for each slice (starting at the end), the method invokes a dsm_destroy_slice method for destroying the then-current Nth slice (lines 33–44). In other words, at this point, the system determines how many slices it has and then repeatedly calls dsm_destroy_slice to destroy each slice. Note that the call includes an xdes parameter, as this is a logged operation. The dsm_destroy_slice method is continually invoked as long as there is greater than one slice. After the slices have been destroyed, the method next invokes hsm_destroy_slice for removing the control page (lines 46–54). After this is done, the table has been successfully "unsliced" and the method may return "success" (at lines 55–56).

As shown above, there are two "destroy slice" methods. dsm_destroy_slice performs the concatenation of page chains. hsm_destroy_slice, on the other hand, simply removes the control page. The dsm_destroy_slice destroys the Nth slice by concatenating the page chains. In an exemplary embodiment, the dsm_destroy_slice method may be constructed as follows:

```
1:  /*
2:  **  dsm_destroy_slice
```

```
 3:   **
 4:   **   Parameters:
 5:   **       xdes             - (I/O) Transaction descriptor
 6:   **       sdes             - (I/O) Session descriptor of the table
 7:   **       slicenum         - (I/P) Slice number to destroy. Must be > 1
 8:   **
 9:   **   Returns:
10:   **       SM_SUCCESS       - Successfully destroyed the slice
11:   **       other status     - Failure status (see slice.h for values)
12:   **
13:   **   Side Effects:
14:   **       The row for the slice in syspartitions system table is deleted.
15:   **
16:   **   Assumptions:
17:   **       1.  The transaction must have taken an exclusive lock on the
18:   **           table.
19:   **
20:   **
21:   */
22:
23:   smstatus_t
24:   dsm_destroy_slice (XDES          *xdes, SDES *sdes, slnum_t slicenum)
25:   {
26:         pgid_t              lastpage;     /* of a slice's page chain */
27:         pgid_t              firstpage;    /* of a slice's page chain */
28:         BUF                 *bp;          /* buffer pointer */
29:         SLCACHE             *cur;         /* slice to destroy */
30:         SLCACHE             *prev;        /* previous/preceding slice */
31:         smstatus_t  status;               /* of unslicing operation */
32:         SCAN_CONTEXT  scan_context;       /* needed to get the first page */
33:
34:         /* Get slcache pointers for current and previous slices */
35:         cur = slcache_des_get (sdes->sdesp, slicenum) ;
36:         prev = slcache_des_get (sdes->sdesp, (slicenum -1) ) ;
37:
38:         /* Housekeeping:
39:         ** Call beginupdate () before making any updates -
40:         ** concatenation, page removal, etc. causes updates to the
41:         ** pages. Last arg is used only in deferred mode and we are not
42:         ** in deferred mode.
43:         */
44:         if (!beginupdate(xdes, sdes, XMOD_DIRECT, 0) )
45:         {
46:               return SM_FAILURE;
47:         }
48:
49:         /*
50:         ** Concatenate page chains.
51:         */
52:
53:         /* Find last page id for the previous slice and get it */
54:         (void) slcache_getval (prev, SLC_LASTPAGE, (BYTE *) &lastpage) ;
55:         sdes->scur.pageid = lastpage;
56:         bp = getpage_noscan (sdes, &scan_context) ;
57:
58:         /* Find first page id for the current slice */
59:         (void) slcache_getval (cur, SLC_FIRSTPAGE, (BYTE *) &firstpage) ;
60:
61:         /*
62:         ** Update prev slice's last page's next page to current
63:         ** slice's first page.
64:         */
65:
66:         if (!new_replace (sdes, bp, OFFSETOF (PAGE, pnextpg),
67:                 (BYTE *) &firstpage, sizeof (firstpage), XREC_MODIFY) )
68:         {
69:               bufunkeep (bp, sdes) ;
70:               return SM_FAILURE;
71:         }
72:         bufunkeep (bp, sdes) ;
73:
74:         /*
75:         ** Update current slice's first page's prev page to prev
76:         ** slice's last page.
77:         */
78:
79:         /* Get first page of the current slice */
80:         sdes->scur.pageid = firstpage;
81:         bp = getpage_noscan (sdes, &scan_context) ;
82:
```

```
 83:        if (!new_replace (sdes, bp, OFFSETOF (PAGE, pprevpg),
 84:            (BYTE *) &lastpage, sizeof (lastpage), XREC_MODIFY) )
 85:        {
 86:            bufunkeep (bp, sdes) ;
 87:            return SM_FAILURE;
 88:        }
 89:
 90:        /* Get last page id of the current slice */
 91:        (void) slcache_getval (cur, SLC_LASTPAGE, (BYTE *) &lastpage) ;
 92:
 93:        /*
 94:        ** If current slice's first page has no rows, free that page
 95:        ** to ensure there are no empty pages in the chain.
 96:        **/
 97:        if (bp->bpage->pfreeoff == PAGEHEADSIZE)
 98:        {
 99:            if (!bp->bpage->pnextpg)
100:            {
101:                /*
102:                ** This is the last page of chain and we are
103:                ** freeing it. Its prev page becomes the last
104:                ** page of the previous slice's chain.
105:                */
106:                lastpage = bp->bpage->pprevpg;
107:            }
108:            /*
109:            ** Remove the page. neighbors_locked param is TRUE
110:            ** because of table lock. prev and next pointers are
111:            ** null because we have not kept those buffers.
112:            **/
113:            if (!removepage (sdes, bp->bpage, NULL, NULL,
114:                TRUE, bp->bcache_desc->cid) )
115:            {
116:                bufunkeep (bp, sdes) ;
117:                return (SM_FAILURE) ;
118:            }
119:        }
120:
121:        /* We are done with the buffer of the first page */
122:        bufunkeep (bp; sdes) ;
123:        /* Change last page id of
124:        prev slice to concatenated chain's last*/
125:        if (!sl_chgvalue (xdes, sdes, slicenum-1, SLC_LASTPAGE,
126:            (BYTE *) &lastpage) )
127:        {
128:            return SM_FAILURE;
129:        }
130:
131:        /* Done with the update */
132:        if (!endupdate (xdes) )
133:        {
134:            return SM_FAILURE;
135:        }
136:
137:        /* Destroy the current slice. */
138:        if ((status=hsm_destroy_slice (xdes, sdes, slicenum) ) != SM_SUCCESS)
139:        {
140:            return status;
141:        }
142:
143:        return SM_SUCCESS;
144: }
```

The method is invoked with three parameters: transaction descriptor (xdes), session descriptor (sdes), and slice ID or number (slicenum) of the slice to destroy. At lines 34-36, the method uses the in-memory structures (i.e., cache) to gain access to the N (current) and N-1 (previous) slices; these are the slices which the method operates on. At lines 38-47, the method performs housekeeping, calling beginupdate method.

The page chains are concatenated at lines 49-72. This is done by finding the last page of the previous slice (line 54) and the first page for the current slice (line 59), and then merging the two together. Recall that the last page of the previous slice was pointing to NULL, because that was the end of that chain. Now, the pointer is updated to point to the first page of the next (i.e., current) slice (lines 61-72). Similarly, the current slice should point back to the previous slice: the backward link has to be set up as well as the forward link. This is done at lines 74-88. In particular, the method gets the first page of the current slice (lines 80-81). Then it updates the previous pointer of the current slice's first page to point to the last page of the previous slice (lines 83-88).

Once that is done, the method gets the last page (ID) of the current slice, that is the slice currently being destroyed (lines 90-91). The reason for doing this is as follows. If there exists no rows for the current (Nth) slice, then there is no point in keeping an empty page around. In other words, when at the last page, if it is empty, the method prefers to free up the page. This is done at lines 93–119. Specifically, at line 97, the method tests whether no rows exist in the last page. In the event that none are found, the method then proceeds to free up the last page (particularly lines 108–118). This is followed by release of the buffer for the first page, at lines 121–122. At lines 124–129, the method performs a cache update by changing the last page ID of the previous slice to that of the concatenated page chain's last page. After ending the (logged) update at lines 131–135, the method invokes the hsm_destroy_slice method for destroying the current slice (lines 137–141). Upon completion of that call, the method is done and may return a "success" result (line 143).

The hsm_destroy_slice method destroys a partition for an object by deallocating the control page and deleting the row entry from the SYSPARTITIONS table. As with the dsm_destroy_slice method, the hsm_destroy_slice method is invoked with parameters of a transaction descriptor (xdes), a session descriptor (sdes), and a slice ID or number (slnum).

In an exemplary embodiment, the hsm_destroy_slice method may be constructed as follows:

```
 1:  /*
 2:  **   hsm_destroy_slice
 3:  **
 4:  **   Parameters:
 5:  **      xdes          -- Ptr to the transaction descriptor
 6:  **      sdes          -- SDES ptr for the heap object
 7:  **      slnum         -- the slice number to deactivate
 8:  **
 9:  **   Returns:
10:  **      status
11:  **
12:  **   Side Effects:
13:  **      None.
14:  **
15:  **   Synchronizations:
16:  **      A table level lock must have been acquired by the caller.
17:  **
18:  */
19:
20:  smstatus_t
21:  hsm_destroy_slice (XDES *xdes, SDES *sdes, slnum_t slnum)
22:  {
23:       SLCACHE            *slc;
24:       BUF                *bp;
25:       objid_t            objid;
26:       DES                *des;
27:       PGALLOC_CTRL       pgc;       /* Page deallocation control record */
28:       VOLATILE SLICE_CRT_CPY   copy;
29:       SCAN_CONTEXT       scan_context;  /* needed to get control page */
30:
31:
32:       objid = SDES_OBJID (sdes) ;
33:
34:       /* get slcache for this particular partition number */
35:       if (slnum == 1)
36:            slc = & (sdes->sdesp->dslinfo.sd_slice1) ;
37:       else
38:            slc = slcache_des_get (sdes->sdesp, slnum) ;
39:
40:       /* get the pageid of the control page so can deallocate it */
41:       sdes->scur.pageid = slc->sc_ctrlpg;
42:
43:       /* get scan_context for control page */
44:       getpage_init_scan_context (&scan_context, sdes, objid,
45:                                  TABENTRY, NULL_CACHEID) ;
46:       bp = getpage_noscan (sdes, &scan_context) ;
47:
48:       if (!beginupdate (xdes, sdes, XMOD_DIRECT, 0) )
49:       {
50:            ex_raise (SLICEMGR, 0, EX_CONTROL, 1) ;
51:       }
52:
53:       /* pg_deallpage () requires a tidy struct */
54:       MEMZERO (&pgc, sizeof (pgc) ) ;
55:
56:       /* log page header contents */
57:       MOVE_FIXED (bp->bpage, pgc.pga_pinfo.pg1_pghdr, PAGEHEADSIZE) ;
58:
59:       pgc.pga_pinfo.pg1_cid = (odcid_t) scan_context.cid;
60:
61:       /*
62:       ** Deallocate the slice's control page by a direct call to
63:       ** pg_deallpage ().
64:       */
65:
```

-continued

```
66:     if (!pg_deallpage (sdes, &pgc) )
67:     {
68:         /* Insufficient log space */
69:         ex_raise (SLICEMGR, 0, EX_CONTROL, 1) ;
70:     }
71:
72:     bufunkeep (bp, sdes) ;
73:
74:     if (slnum == 1)
75:         /* If this is the first slice then
76:         ** we are no longer a sliced object
77:         ** so update sysindexes. */
78:         if (!ind_chgvalue (sdes, xdes,
79:             0, LASTPAGE, (BYTE *) &slc->sc_root) )
80:         {
81:             return (SM_FAILURE) ;
82:         }
83:     if (!endupdate (xdes) )
84:     {
85:         ex_raise (SLICEMGR, 0, EX_CONTROL, 1) ;
86:     }
87:
88:     /* At this point, the control page has been
89:     ** deallocated from the slice. However, we will
90:     ** not erase the control page info from the in-memory
91:     ** structure (as we might rollback).
92:     ** By definition, we only update the last page.
93:     */
94:
95:     des = sdes->sdesp;
96:
97:     /* delete the slice row from Syspartitions */
98:     sl_row_delete (xdes, objid, slnum) ;
99:
100:    /* don't decrement the count if we are the first
101:    ** slice because an unsliced object has one slice.
102:    */
103:    if (slnum > 1)
104:        des->dslinfo.sd_numslices--;
105:
106:    else
107:    {
108:        /*
109:        ** If we are destroying the first slice, move the SLGROUP
110:        ** list from the DES to the xdes. When this transaction
111:        ** ends, we will release this list.
112:        */
113:        xdes->xpost_commit_work = TRUE;
114:        xdes->xslgroup = sdes->sdesp->dslinfo.next;
115:        sdes->sdesp->dslinfo.next = (SLGROUP *) NULL;
116:    }
117:
118:    return (SM_SUCCESS) ;
119:
120: }/* end hsm_destroy_slice */
```

At line 32, the method obtains an object ID for the current object (table); this is obtained from the sdes descriptor. Next, at lines 34–38, the method gets the cache information (slcache) for this particular slice or partition number. The cache information for the first slice is treated as a special case. In particular, the information is maintained in the sdes for the object, thereby optimizing its storage for "unsliced" tables (i.e., tables with only one slice). Next, the method gets the page ID for the control page (lines 40–41) and then fetches the control page (lines 43–46). After some housekeeping steps (lines 48–58), the method deallocates the page by invoking pg_deallpage (lines 61–70). After this is done, the buffer can be freed (line 71).

When the method reaches the last slice (slice number equal 1 at line 73), it is no longer dealing with a sliced object and may therefore update sysindexes with the last page of the object. As the control page has now been removed, the method can proceed to delete the corresponding slice row from the SYSPARTITIONS table (lines 87–97). The method decrements the number of slices at lines 102–103. Recall, however, that the number is preferably not decremented below 1, as each table object in the system is defined to have at least one slice.

When the table was first partitioned, cache information was stored (i.e., by SLGROUP). Therefore, when the system reaches the last slice it will free up the memory. However, this does not occur until after the transaction has committed. The process of freeing up the memory can be deferred until the transaction has committed, by using the previously-described xpost_commit_work boolean. In effect, the method at lines 106–115 marks the memory which needs to be freed up. The method concludes by returning a "success" result at line 117.

The next method, dsm_get_next_page_id, serves to get the ID for the next page in the single logical page chain. Recall that, although there are multiple physical page chains, it is desired to preserve the view of a single logical page chain. It does not suffice, therefore, to get the next page by simply looking at the pointer for the next physical page. Additionally, the system must appropriately handle the traversal of a boundary from the last page of one physical page chain to the first page of another physical page chain. The method dsm_getnextpage does exactly that.

In an exemplary embodiment, the dsm_get_next_page_id method may be constructed as follows (in the C programming language):

```
/*
** dsm_get_next_page_id
**
** Parameters:
**      sdes    — (I/O) Session descriptor of the table
**      bp      — (I/P) Pointer to current page's buffer
**
** Returns:
**      The next page id.
**
** Side Effects:
**      sdes structure may get updated to point at the next slice.
**
** Notes:
**      It is acceptable to call this function even if the table is
**      not sliced, in which case the function behaves as if the table
**      has one slice.
**
*/
pgid_t
dsm_get_next_page_id(SDES *sdes, BUF *bp)
{
        pgid_t     pageid;
        slnum_t    slicenum;      /* number of slices */
        slnum_t    cur_slicenum;  /* current slice number */
        /*
        ** It will be a good idea to make this fucntion a macro so
        ** that the next statement (which is the common case) gets
        ** executed without the cost of a procedure call.
        */
        /* If not end of chain, return the next page id */
        if (bp—>bpage—>pnextpg != 0)
        {
                return bp—>bpage—>pnextpg;
        }
        /* We are at the end of a page chain. */
        /*
        ** For clustered and non-clustered index scans (sindid != 0),
        ** and for table scans (sindid == 0) on unsliced tables,
        ** end of the chain indicates next page is zero.
        */
        if ((sdes—>sindid != 0) || !DSM_IS_TABLE_SLICED(sdes))
        {
                return 0;
        }
        /* For sliced table, position the scan on the next slice */
        /* Get number of slices for the table */
        slicenum = SDES_NUMSLICES(sdes);
        /* Get the slice number currently positioned on */
        cur_slicenum = SDES_CURSLICE(sdes);
        /* If already at the last slice, next page id is 0 */
        if (cur_slicenum == slicenum)
        {
                return 0;
        }
        /* Change SDES to point at the next slice */
        slcache_getnext_slice(sdes);
        /* Get the first page id of the slice */
        (void) slcache_getval(sdes—>sslcacheptr, SLC_FIRSTPAGE,
                        (BYTE *)&pageid);
        /* That is the next page for the scan */
        return pageid;
}
```

Given an sdes and a buffer which contains the current page, the method will examine the buffer and fetch the next slice, if one exists. If the current slice is the third slice, for instance, and the object contains a fourth slice, the method will fetch the first page of the fourth slice, by returning a page ID.

The specific steps of the method are as follows. First, the method examines the buffer passed in to see whether it contains a valid next page pointer. If it does, the method simply returns the ID for that next page and is done. In other words, if the method is not traversing the boundary between two physical page chains (or is not at the end of the last page chain), it may simply return the ID for the next physical page. Otherwise, the method has reached the end of a boundary. It must at this point, therefore, determine whether the table is sliced. If the table is not sliced, then the method has finally reached the end of the last page chain and has really reached the end of the single logical chain; in such a case it may simply return. The ID, for this case, is set to zero, thereby indicating the end of the page chain.

If the table is a sliced table, on the other hand, the method must position the scan on the next slice. Before this may be done, the method must first determine how many slices exist for the table. Macros are defined for extracting this information out of the sdes data structure. From this information, the method can determine the next slice. Upon making this determination, the method simply gets the page ID for the first page for this next slice.

The next method determines whether a table is empty. Prior to partitioning, it was a simple matter to determine whether a table was empty. If the first page had no rows, then the table was empty, as the first page was the only page in the object. With partitioned tables, the fact that one partition or slice is empty does not necessarily mean all other slices are empty. Therefore, the other slices must be checked. The dsm_is_table_empty method checks exactly this:

```
/*
** dsm_is_table_empty
*
** Parameters:
**      sdes    — (I/O) Session descriptor of the table
**      bp      — (I/P) Pointer to current first page's
**                      buffer. For a sliced table, it is the
**                      first page of the first slice.
**
** Returns:
**      TRUE if table has zero rows and FALSE otherwise.
**
** Side Effects:
**
**
** Notes:
**      It is acceptable to call this function even if the table is
**      not sliced, in which case the function behaves as if the table
**      has one slice.
**
** Assumptions:
**      1. The transaction must have taken table-level lock in share or
**         exclusive mode.
**
*/
int
dsm_is_table_empty(SDES *sdes, BUF *bp)
{
        slnum_t       slicenum;      /* number of slices */
        slnum_t       i;             /* current slice number */
        int           empty;         /* slice has rows? */
        pgid_t                 saved_pageid;
        SLCACHE       *saved_slcacheptr;
        slnum_t       saved_curslice;
        SCAN_CONTEXT  scan_context;  /* to retrieve first page */
        /*
        ** If the first slice's page chain is not empty, we are done.
```

```
                                -continued
** Else, if the table is not sliced, nothing more to check.
*/
if (!DSM_IS_PAGECHAIN_EMPTY(bp))
{
    return FALSE;
}
else if (!DSM_IS_TABLE_SLICED(sdes))
{
    return TRUE;
}
/*
** It is a sliced table. For the table to be empty, all slices
** must be empty. First slice is known to be empty from above.
*/
/* Save sdes values that may get changed due to slice
processing */
saved_pageid = sdes->scur.pageid;
saved_slcacheptr = sdes->sslcacheptr;
saved_curslice = sdes->scurslice;
/* Get the total number of slices for the object */
slicenum = SDES_NUMSLICES(sdes);
/*
** Go through each slice until a non-empty slice is found.
** First slice is already found to be empty.
*/
empty = TRUE;
sdes->scurslice = 1;
for (i = 2; i <= slicenum && empty; i++)
{
    /* Change SDES to point at the next slice */
    slcache_getnext_slice(sdes);
    /* Get the first page id of the slice and then the page */
    (void) slcache_getval(sdes->sslcacheptr,
            SLC_FIRSTPAGE, (BYTE *)&sdes->scur.pageid);
    /* get scan context */
    getpage_init_scan_context(&scan_context, sdes,
            SDES_OBJID(sdes),
            TABENTRY, NULL, CACHEID);
    bp = getpage_noscan(sdes, &scan_context);
    /* Determine if slice is empty */
    empty = DSM_IS_PAGECHAIN_EMPTY(bp);
    /* Done with the page */
    bufunkeep(bp, sdes);
}
/*
** Restore the values in SDES that might have been changed
** due to slice processing above.
*/
sdes->scur.pageid = saved_pageid;
sdes->sslcacheptr = saved_slcacheptr;
sdes->scurslice = saved_curslice;
return empty;
}
```

The method is generic in the sense that the caller does not have to be concerned whether the table is sliced or not; the method does the work for either case. The method operates by reading in the first page of the object (i.e., what the caller thinks is the first page). If that page is not empty, then clearly the object is not empty, in which case the method may return "false." The next case is one in which the first page is empty and the table is not sliced. In such a case, the method may return "true," thereby indicating that the object is in fact empty. The remaining cases are ones in which the method is dealing with a sliced table and the first page is empty. Here, the method must look at the other slices to see whether they are empty.

This is done as follows. The method gets the number of slices. Then, it sets up a loop to look at the first page in each slice. For each such page, the method makes a determination of whether the page is empty. A page is empty when it contains no rows. If all pages are empty, the method may return "true," thereby indicating that the object, which is sliced, is empty. If any one of the slices is not empty, however, the method may conclude that the object is not empty and return "false."

The next method, dsm_change_last_page_id, simply serves to change the last page ID of a page chain. The need for this typically arises when appending a page. Again, the method insulates the caller from concerns about whether the object is sliced or unsliced.

In an exemplary embodiment, the method may be constructed as follows (in the C programming language):

```
/*  dsm_change_last_page_id
**      Changes the last page id of a page chain to the new id.
**
**
**  Parameters:
**      xdes - (I/O) Transaction descriptor
**      sdes - (I/O) Session descriptor of the table
**      slicenum - (I/P) Slice number of the page chain. 0 if
**          caller does not know the slice number;
**          unused if the table is not sliced.
**      old_lastpage - (I/P) Old last page id
**      new_lastpage - (I/P) New last page id
**      allocated - (I/P) Change due to allocation of a new page
**          as last page (TRUE) or deallocation of
**          the current last page (FALSE)
**
**  Returns:
**      TRUE if change is successful and FALSE otherwise.
**
**  Notes:
**      It is acceptable to call this function even if the table is
**      not sliced.
**
**
*/
int
dsm_change_last_page_id(XDES *xdes, SDES *sdes, slnum_t
        slicenum, pgid_t old_lastpage, pgid_t new_lastpage, int
        allocated)
{
    SLCACHE *slc;
    int status; /* From sl_chgvalue */
    /*
    ** If unsliced table, call sysindexes manager to change last
    ** page id. 0 is the index id for heap's row in sysindexes.
    */
    if (!DSM_IS_TABLE_SLICED(sdes))
    {
        return ind_chgvalue(sdes, sdes->sxdesp, 0, ROOTPAGE,
                (BYTE *) &new_lastpage);
    }
    /* Unless given, find slice number old_lastpage belongs to */
    if (slicenum == 0)
    {
        if ((slc = slcache_findslice(sdes->sdesp, old_lastpage,
                SLC_LASTPAGE)) == NULL)
        {
            return FALSE;
        }
        slicenum = slc->sc_slicenum;
    }
    /* Change the last page id of the slice */
    status = sl_chgvalue(xdes, sdes, slicenum,
            (allocated) ? SLC_LASTPG_PLUS : SLC_LASTPAGE,
            (BYTE *) &new_lastpage);
    return status;
}
```

The steps of the method are as follows. If the table is not sliced, the method simply changes the page ID in one place, sysindexes, because there is exactly one last page. If, on the other hand, the object is a sliced object, the method must figure out which slice the last page belongs to and then change the last page ID. The change is made by finding the corresponding entry in cache and updating it accordingly.

The hsm_create_slice and hsm_destroy_slice methods have already been described (during operation of methods of the Dataslices manager). In addition to these methods, the Heapslices manager includes the previously-mentioned methods for "opening" and "closing" a slice. The hsm_open method is invoked when the system is ready to perform an INSERT operation. The system must decide which slice to insert into and position the sdes on that particular slice (by setting a pointer to the appropriate cache entry).

In an exemplary embodiment, the method may be constructed (using the C programming language) as follows:

```
/*
** hsm_open
**
** Parameters:
**     sdes -- SDES ptr for the heap object
**     slnum -- the slice number to open
**
** Returns:
**     None
**
** Side Effects:
**     calls the hsm_strategy() to get a slice assignment
**     if the slnum = 0.
**     Sets the SLCACHE ptr and the current slice number
**     in the SDES.
**
** Synchronizations:
**
*/
void
hsm_open(SDES *sdes,
        slnum_t slnum)
{
    SLCACHE *slc;
    if (slnum == 0)
    {
        slnum = hsm_strategy(sdes);
    }
    slc = slcache_des_get(sdes->sdesp, slnum);
    sdes->sslcacheptr = slc;
    sdes->scurslice = slnum;
    /* indicate that the session has opened a slice */
    sdes->sstat2 |= SS2_SLICE_OPENED;
}/* end hsm_open */
```

The steps of the method are as follows. First, the method looks to whether the caller of the method actually specified a particular slice (i.e., slice number). If the caller has not already chosen a slice, then the method calls on to a subroutine, hsm_strategy, which will choose a slice at random. Based on this information, the method gets the pointer to the corresponding cache entry, sets the sdes to point to that cache entry, and sets the slice number. Finally, the method indicates that the slice has been opened, setting an appropriate flag in the sdes. The flag is provided so that this method is not repeatedly called.

Complementing the above method is hsm_close. It serves to indicate that the system is done with inserts to the partition. In an exemplary embodiment, the method may be constructed (using the C programming language) as follows:

```
/*
** hsm_close
**
** Parameters:
**     sdes    -- SDES ptr for the heap object
**
** Returns:
**     None
**
** Side Effects:
**     none
**
** Synchronization:
**
*/
void
hsm_close(SDES *sdes)
{
    SLCACHE *slc;
    slnum_t slnum;
    slnum = sdes->scurslice;
    slc = slcache_des_get(sdes->sdesp, slnum);
    sdes->sslcacheptr = (SLCACHE *)NULL;
    sdes->scurslice = 0;
    sdes->sstat2 &= ~SS2_SLICE_OPENED;
}/* end hsm_close */
```

The method operates as follows. It sets the cache pointer in the sdes descriptor to NULL, thereby indicating that the system is not accessing a particular slice at that moment. Thereafter, the method is done.

The hsm_strategy method generates a random number in the method, for randomizing the selection of a partition. It may be constructed as follows:

```
/*
** hsm_strategy
**
** Parameters:
**     sdes  --SDES ptr to a sliced object.
**
** Returns:
**     slice number
**
** Side Effects:
**     none.
**
** Synchronizations:
**
*/
slnum_t
hsm_strategy(SDES *sdes)
{
    if (sdes->sxdesp->xslicehashval == 0)
    {
        /*
        ** For this transaction, this is the first insert into
        ** a slice table. Generate a random value and store
        ** it in xdes. This is used to choose a slice for this
        ** insert and future inserts by this transaction.
        */
        Eresource->erslicerandomval =
            (ersource->erslicerandomval + SLICERAND) &
                0x7fffffff;
        /*
        ** To reduce the probability of two engines getting
        ** the same random value, add engine id.
        */
        sdes->sxdesp->xslicehashval = Eresource->
            erslicerandomval + Engine_number;
    }
    /*
    ** Choose a slice based on the hash value in xdes.
    ** With this formula, it is ensured that multiple insert
    ** statements into the same table within the same transaction
    ** will use the same slice of the table. If a slice is
    ** randomly chosen for each insert then we get the following
    ** undesirable behavior: a transaction with
    ** multiple insert statements into the same table may end up
    ** using more than one slice of the table thereby preventing
    ** other transactions from inserting into the table.
    */
    return (sdes->sxdesp->xslicehashval %
        SDES_NUMSLICES(sdes)) + 1;
}/* end hsm_strategy */
```

Once the number is generated, the method stores it in the xdes descriptor. Recall that the sdes stores a pointer to the xdes. Accordingly, it can be determined from the sdes which xdes is currently being employed (i.e., for the current transaction). The random number is, therefore, stored in the xdes field and is available to the sdes data structure, via a pointer de-reference. The object, in turn, performs a modulus on the random number with the number of partitions, for figuring out which particular partition to go to. The random number itself is refreshed on a per transaction basis.

The method for allocating a new page is hsm_alloc_page. It serves to allocate a new page to a partition. In contrast to a page allocation routine for unsliced objects, this method looks at the device affinity map, for determining the preferred device or devices for the current partition.

In an exemplary embodiment, the hsm_alloc_page method may be constructed (using the C programming language) as follows:

```
/*
** hsm_alloc_page
**      This function is called to add a new page to the end of the
**      current partition's page chain
**
** Parameters:
**      sdes    --SDES ptr to a partitioned object.
**      indptr  -- ptr to the heap's INDEX row
**      targetpg -- page id indicating where to start the search
**                  (used as a hint for allocation)
**      pgc     -- allocation page context.
**
** Returns:
**      buffer containing allocated page or null
**
** Side Effects:
**      none.
**
** Syncronizations:
**
*/
BUF *
hsm_alloc_page(SDES      *sdes,
               INDEX     *indptr,
               pgid_t    targetpg,
               PGALLOC_CTRL *pgc)
{
    BUF     *newbp;
    BUF     *bp;           /* control page buffer */
    DEV_INFO_ELEM *dmap;
    SLICE_CTRLBLK *cbp;
    /*
    ** Access the control page for the slice to obtain the device
    ** assignment map.
    */
    sdes->scur.pageid = sdes->sslcacheptr->sc_ctrlpg;
    /*
    ** The scan context for the control page will be the
    ** same as that for the page allocation.
    */
    bp = getpage_noscan(sdes, &pgc->pga_scan_context);
    cbp = (SLICE_CTRLBLK *) ((BYTE *)bp->bpage +
                             PAGEHEADSIZE);
    dmap = (DEV_INFO_ELEM *) ((BYTE *)bp->bpage +
                              PAGEHEADSIZE + sizeof(SLICE_CTRLBLK);
    newbp = pg_biased_allocate(sdes, indptr, targetpg,
                   pgc, dmap, &cbp->scp_afftbl_offset,
                   cbp->scp_afftbl_count);
    /* unkeep the control page buffer */
    bufunkeep(bp, sdes);
    return(newbp);
}/* end hsm_alloc_page */
```

The steps of the method are as follows. Given an sdes (which is essentially a pointer to the object), the method determines the control page ID for the slice. It next reads the control page for accessing the device map. Using the particular device affinity indicated by the map, the method will then call on to the page allocation method, passing a pointer to the device affinity map.

The method hsm_get_slgroup is needed when an object is first partitioned. It sets up the memory for the cache entry and, in an exemplary embodiment, may be constructed (using the C programming language) as follows:

```
/*
** hsm_get_slgroup
**      This function grabs as many SLGROUP structures from the
**      free pool as specified. It returns a pointer to the head
**      of the newly allocated null-terminated list of groups.
**
** Parameters:
**      count - Number of SLGROUPs to be allocated.
**
** Returns:
**      Pointer to the head of the list of SLGROUP structures (or NULL)
**
** Side Effects:
**      None.
**
** Synchronizations
**      Grabs the slgroup freelist spinlock.
**
*/
SLGROUP *
hsm_get_slgroup(int count)
{
    struct spinlock *master; /* local copy of freelist spinlock */
    SLGROUP *head;  /* local copy of head of freelist */
    SLGROUP *cur;   /* temporary pointer to SLGROUP list */
    SLGROUP *prev;  /* temporary pointer to SLGROUP list */
    int i;          /* Counter for allocating SLGROUPS */
    master = Resource->rslgroup_spin;
    cur = head = Resource->rslgroup_head;
    prev = (SLGROUP *)NULL;
    P_SPINLOCK(master);
    if (head == (SLGROUP *)NULL)
    {
        V_SPINLOCK(master);
        return (SLGROUP *)NULL;
    }
    else /* Attempt the allocation */
    {
        /* Remove 'count' SLGROUP entries from the list */
        for (i = 0; i < count; i++)
        {
            if (cur != (SLGROUP *)NULL)
            {
                prev = cur;
                cur = cur->next;
            }
            else
            {
                /* There aren't enough SLGROUPs. */
                V_SPINLOCK(master);
                return (SLGROUP *)NULL;
            }
        }
        /* We allocated as many SLGROUPS as required. */
        Resource->rslgroup_head = cur;
    }
    V_SPINLOCK(master);
    /* Terminate the list just allocated. */
    prev->next = (SLGROUP *)NULL;
    return (head);
}/* end hsm_get_slgroup */
```

Given a certain number of partitions to create, the method allocates sufficient memory in the cache for supporting that number of partitions. It return a pointer to that memory. The method is typically invoked by the hsm_create_slice method. In order to minimize pointer overhead, a number of cache entries are packaged into each SLGROUP. In an exemplary embodiment, each SLGROUP stores 16 cache entries. Based on the number of partitions required, the method will allocate one or more groups, as needed. The method also allocates spin locks. Each cache requires a spin lock, in order to lock it from other operators.

In operation, the method gets the head of free memory (i.e., free pool) and then computes (outside the caller) how many groups are needed, accounting for the fact that the first group is stored in the sdes. If sufficient memory is available, the method makes the allocation and sets the list head accordingly. Spin locks are employed at this point so other processes do not attempt to allocate the same groups. After the allocation is made, the lock is released.

In a complementary manner, the memory is released back to the free list when it is no longer needed, typically when a table is unpartitioned. In such an instance, the post-commit flag is set so that memory will be freed upon completion of the transaction. The typical sequence is as follows: First, a table is unpartitioned. All the memory for the cache is put into the xdes, with the post-commit flag set to true. Upon completion of the transaction, the post-commit flag is examined for determining whether memory is to be freed. When the flag is set to true, the memory pointed to by the xdes is placed back on the free list. The actual task of freeing the memory is done by a free_slgroup method. This is done under control of spin locks.

The method hsm_get_slicelk is the particular routine which gets the spin lock for a cache. It may be constructed as follows:

```
/*
** hsm_get_slicelk
**      This function returns spinlock from the global
**      pool. A spinlock can be assigned more than one slice.
**
** Parameters:
**      void
**
** Returns:
**      A pointer to a spinlock structure
**
** Side Effects:
**      None.
**
*/
struct spinlock *
hsm_get_slicelk(void)
{
    SLICESPIN_CB *slicecb;
    struct spinlock *master;
    int temp;
    struct spinlock *spinptr;
    master = Resource->rslgroup_spin;
    slicecb = ((SLICESPIN_CB *)Resource->rslicespin_cb);
    P_SPINLOCK(master);
    /* get index for next spinlock to be assigned */
    if (slicecb->scb_spinassign == slicecb->scb_spinlk_count)
    {
        slicecb->scb_spinassign = 0;
    }
    temp = slicecb->scb_spinassign++;
    V_SPINLOCK(master);
    spinptr = slicecb->scb_spinarray + temp;
    return spinptr;
}/* end of hsm_get_slicelk */
```

The method operates as follows. First, memory is obtained, one partition per cache. As the system is creating partitions (in hsm_create_slice), the system allocates a spin lock as it writes the information into the cache. A small set of spin locks is employed to manage the caches. It does not matter if, on occasion, the same spin lock is assigned to two different caches. This is because the real interest is interlocking the operation to the slice. The chance of a true collision is low. As a result, the preferred embodiment employs a pool of spin locks, as opposed to an exclusive spin lock per cache. The method get_slicelk loops through the small pool of spin locks, assigning spin locks in a round-robin manner.

The hsm_map_objdev method addresses the following issue. Given all the devices that a particular object maps to, how should a set of devices be assigned to the Nth slice? The method is invoked with a list of all devices which map to the object. The segment ID is used to track which device is assigned to which object. The device map itself was created in dsm_slice_table, by a call to hsm_map_lbjdev (lines 44-45 of dsm_slice_table). The dev map contains the list of devices.

In an exemplary embodiment, the hsm_map_objdev method may be constructed (using the C programming language) as follows:

```
/*
** HSM_MAP_OBJDEV
**
** Parameters:
**      segid -- Segment id from sysindexes.
**      dbt -- A pointer to the tables dbtable.
**              We need this parameter to get the
**              table's dbt_map.
**      devmap -- ptr to an array of MAXVIRT devids. The array
**              is filled with the device ids of the devices
**              that belong to this segment.
**
** Returns:
**      The count of number of unique devices.
**
** Side Effects:
**
** Synchronizations:
**
*/
int32
hsm_map_objdev(int16 segid, DBTABLE *dbt, uint32 *devmap)
{
    DISKMAP *dmap;
    uint32 *temp;
    int32 vdevno; /* Device id found in dbt_map */
    int32 devcount; /* # distinct devices in seg. */
    uint32 bitmap[NVDISK/BITSP_INT32]; /* Bitmap of devices */
    int i; /* loop thru dbtable */
    /* zero the bitmap */
    MEMZERO((BYTE *)bitmap, (NVDISK/BITSP_INT32));
    devcount = 0;
    /* For each entry in the dbt_map, if it belongs to the segment,
    ** find the device id D that this entry corresponds to and set the
    ** Dth bit in the bitmap. Also, increment the number of unique
    devices.
    **
    ** If this is the first time the device has been seen, then also
    store
    ** the device id in the devmap.
    */
    for (i = 0, dmap = dbt->dbt_map;
         (i < MAXVIRT) && (dmap->dm_size != MAP_TERM); i++,
         dmap++)
    {
        if (dmap->dm_segmap & (0x1 << segid)) /* Matched segid */
        {
            /* get device number from high byte of pgid_t */
            vdevno = ((((unsigned long) dmap->dm_vstart)
                        >> 24) & 0xFF);
            /* Position to the correct cell in the bitmap. */
            temp = bitmap + (vdevno/BITSP_INT32);
            /* Add to list of devices if not already seen */
            if (!((*temp) & (0x1 << (vdevno & 0x1F))) )
            {
                *temp |= (0x1 << (vdevno & 0x1F)); /* Set bit */
                /* Store in the caller's array */
                devmap[devcount] = (int)vdevno;
                devcount++;
            }
        }
    }
    return (devcount);
```

}/* end hsm_map_objdev */

The steps of the method are as follows. A specific segment is mapped to a set of devices. Given a segment ID, the method looks through the list to see which devices belong to the segment. The method creates a unique list of such devices, so that the same device is not repeated. A bitmap, in the form of an integer array, is employed for keeping track of devices. If the device has been seen before, it is counted; otherwise, it is not.

First, the method zeros out the bit map. Next, the method enters a "for" loop for examining each entry in the table. If the segment ID matches (i.e., this is a candidate), the method gets the device number from the page ID. The method then sets the corresponding bit in the bitmap. The count is returned to the caller. The segment ID itself may be thought of as a range of page IDs (i.e., group of consecutive page IDs). On each physical disk, one or more "devices" can be created; each device, therefore, may be thought of as a "chunk" of a disk. A segment is a way of grouping together (logically) devices and assigning them one name. Since they are grouped together, it is necessary to break them apart to find out which individual chunks constitute a segment, so that the system may perform a chunk-to-partition affinity.

The hsm_build_slicemap method may be constructed as follows:

```
/*
**
** HSM_BUILD_SLICEMAP
**
** This function associates the set of logical page ranges with a slice
** based on the devices to which the slice has affinity.
**
** If the number of devices D available is more than the number of
** slices N, then we associate every Nth device to slice n, starting
** at nth device. In other words, if there are 10 devices and 3 slices,
** for the 2nd slice, we will assign the 2nd, 5th and 8th device.
**
** Any remaining devices are distributed among the slices in a round-
robin
** manner.
**
** The device to slice assignment is best illustrated by an example:
** The following table shows the assignment for a table with 5
partitions
** and 12, 5 or 3 devices respectively.
**
** Partition id Device assignments for segment with
**              12 devices  5 devices  3 devices
**
**     P1       [D1, D6], D11   [D1]   D1
**     P2       [D2, D7], D12   [D2]   D2
**     P3       [D3, D8], D11   [D3]   D3
**     P4       [D4, D9], D12   [D4]   D1
**     P5       [D5, D10], D11  [D5]   D2
**
** Notice that if there are more devices than slices, then each slice
** will get a set of "exclusive" devices as well as (possibly) one
** device that is shared with some other slices.
** In the above example, devices listed within [] are exclusively
** assigned to a slice.
**
** Note 1: Dn means the nth device available for this mapping.
**
** Note 2: There may be multiple entries in the dbt_map corresponding
**    to a single device. Each such entry will be added to the
**    afftbl.
**
** *Note 3: Since a database cannot have more than MAXVIRT entries
**    and the afftbl also has MAXVIRT entries, we will never overflow
**    the afftbl while creating the mapping.
**
** Parameters:
**    sdes - pointer to the sdes
**    slnum - the slice number to create.
**    totalslices - total number of partitions in this table.
**    totaldevs - number IO devices on which the
**        the object can exist.
**    devmap - ptr to an array of virtual device
**        ids for the object;
**    afftbl - ptr to slice's device affinity table
**        (results are placed here)
** Returns:
**    The number of elements in the affinity table.
**
** MP Synchronization:
**
** Side Effects:
**
**
*/
int32
hsm_build_slicemap(SDES *sdes,
        slnum_t slnum,
        int32 totalslices,
        int32 totaldevs,
        uint32 *devmap,
        SLICE_AFFTBL *afftbl)
{
    int32 dev_perslice; /* Number of devices exclusively
            ** assigned to a slice.
            */
    int32 rem_devs; /* Number of devices that will be
            ** shared by more than one slice.
            */
    int32 devidx; /* Index into devmap */
    int32 elemidx; /* index into affinity map */
    int32 i; /* loop counter to index thru devmap */
    /* zero the affinity table */
    MEMZERO((BYTE *)afftbl, sizeof(struct slice_afftbl));
    elemidx = 0; /* Start assigning from the first slot */
    dev_perslice = totaldevs/totalslices;/* Number of "exclusive" devs */
    rem_devs = totaldevs % totalslices; /* Number of "shared" devs */
    /* Assign the exclusive devices first */
    for (i = 0; i < dev_perslice; i++)
    {
        /*
        ** Determine which device to use. Note that slice numbers
        ** are 1-based and the devmap array is 0-based. If N is
        ** total number of slices, assign every Nth device to
        ** slice s, starting at the (s-1)th device in the devmap.
        */
        devidx = (slnum - 1) + i * totalslices;
        /* assign this device to the slice. */
        hsm__fill_afftbl(sdes, devmap[devidx], (SLICE_AFFTBL *)
        afftbl,
            &elemidx);
    }
    /*
    ** The first (dev_perslice * totalslices) are assigned exclusively.
    ** Distribute the remaining in a round-robin manner.
    */
    if (rem_devs) /* Some devices that will be shared */
    {
        /*
        ** Determine which of these shared devices can be assigned
        ** to this slice.
        */
        devidx = (dev_perslice * totalslices) + (slnum % rem_devs)
        /* assign this device to the slice. */
        hsm__fill_afftbl(sdes, devmap[devidx], (SLICE_AFFTBL *)
        afftbl,
            &elemidx);
    }
    return elemidx;
}/* end hsm_build_slicemap */
```

Given the devices which belong to an object, for the Nth slice, which is the subset of devices which belong to the Nth slice. The method is invoked with a total number of slices, total number of devices, and a device map (among other things). The method, in turn, completes a slice affinity table which is passed back to the caller. The assignment of devices to slices occurs in a round-robin fashion (with excess or reuse, depending on the relative number of slices to devices).

The hsm_fill_afftbl method is used to fill in the affinity table on the control page for a slice and may be constructed as follows.

```
/*
**
** HSM_FILL_AFFTBL
**
**
** Parameters:
**    sdes - of the sliced table
**    dev_id - device id whose entries are being assigned.
**    afftbl - Affinity table to be filled in.
**    elemidxp - ptr to index into the affinity table where we
**        can insert new entries. Since there may be multiple
**        entries corresponding to the device, this may get
**        incremented several times.
**
** Returns:
**    None
**
** MP Synchronization:
**
** Side Effects:
**
*/
void
hsm_fill_afftbl(SDES *sdes,
                int32 dev_id,
                SLICE_AFFTBL *afftbl,
                int32 *elemidxp)
{
    DISKMAP *dmap;
    int vdevno;
    int i; /* loop thru dbtable */
    DBTABLE *dbt = sdes->sdesp->ddbtable;
    /*
    ** For each entry in the dbtable->dbt_map that is mapped to the
    dev_id,
    ** assign the starting page number and size to the afftbl.
    */
    for (i = 0, dmap = dbt->dbt_map;
        (i < MAXVIRT) && (dmap->dm_size != MAP_TERM); i++,
        dmap++)
    {
        /* Determine whether this is for my device */
        vdevno = ((((unsigned long) dmap->dm_vstart) >>24) & 0XFF);
        if (vdevno == dev_id) /* copy this entry */
        {
            afftbl->sat_affelem[*elemidxp].di_lstart =
                dmap->dm_lstart;
            afftbl->sat_affelem[*elemidxp].di_size = dmap->dm_size;
            (*elemidxp)++; /* Next slot in afftbl */
        }
    }
}/* end hsm_fill_afftbl */
```

When the system is first initialized, it is not the case that every partition object will be immediately accessed. For instance, a query might not have occurred against a particular partition. When the object is first accessed, the system notices that no des has been set. As part of constructing the des (i.e., the memory structure which describes this object), the system constructs an affinity map in the case that the object is partitioned. This is done on-the-fly the first time the object is accessed. The hsm_fill_afftbl method constructs this information and returns to the caller.

The hsm_allocate method is a low level allocation routine, which encapsulates the affinity map (before calling the page allocation routines). In an exemplary embodiment, it may be constructed (using the C programming language) as follows:

```
/*
**
** hsm_allocate
**
** Parameters:
**    sdes    -- SDES ptr for the object that is being sliced.
**    indexp  -- A ptr to the filled-in index row (indid =0)
**    target  -- Allocate near this target page (can be zero)
**    cpflag  -- Boolean. Flag indicating control page flag.
**              (flag == TRUE => control page.)
**    afftbl  A ptr to the slice's device affinity table.
**    count   -- Number of valid entries in the afftbl.
**    startp  -- points to a int32 value, that is used as
**              the starting index for the affinity map
**              for the object.
**
** Returns:
**    a pointer to a buffer
**
** Side Effects:
**    None.
**
** Synchronizations:
**    done at the page manager level.
**
*/
BUF *
hsm_allocate(SDES           *sdes,
             INDEX          *indexp,
             pgid_t         target,
             uint32         cpflag,
             SLICE_AFFTBL   *afftbl,
             int32          count,
             int32          *startp)
{
    PGALLOC_CTRL  pgc; /* Page allocation control record */
    PAGE    *xapghdr;
    BUF     *bp;
    MEMZERO(&pgc, sizeof(pgc));
    xapghdr = (PAGE *) pgc.pga_pinfo.pg1_ghdr;
    /* check if we are allocating a control page */
    if (cpflag)
    {
        xapghdr->pminlen = sizeof(SLICE_CTRLBLK);
    }
    else
    {
        xapghdr->pminlen = indexp->indminlen;
    }
    /*
    ** Fill-in the page header for the new slice
    */
    xapghdr->pobjid = SDES_OBJID(sdes);
    xapghdr->pindid = (BYTE)TABENTRY;
    xapghdr->pstat = PG_DATA;
    xapghdr->plevel = 0;
    xapghdr->pnextpg = xapghdr->pprevpg = 0;
    /* get scan_context for control page */
    getpage_init_scan_context(&pgc.pga_scan_context, sdes,
            SDES_OBJID(sdes), TABENTRY, NULL_CACHEID);
    /* Set the cacheid in the log record */
    pgc.pga_pinfo.pg1_cid = (odcid_t) pgc.pga_scan_context.cid;
    pgc.pga_loh.loh_op = XREC_ALLOC;
    pgc.pga_loh.loh_status = LHSX_NULL;
    pgc.pga_locktype = 0;
    bp = pg_biased_allocate(sdes, indexp, target, &pgc,
            afftbl->sat_affelem,
            startp, count);
    return(bp);
}/* end of hsm_allocate */
```

The method reads the control page in order to get to the device affinity map. This is passed to the page allocation routine.

Finally, an initialization routine is employed to set the seed for random number generation. It may be constructed as follows:

```
/*
** HSM_INIT_ENGINERANDVAL
**
**
** Parameters:
**     eresourcep -- Pointer to the engine resource array
**     numengines -- Number of engines for which the cache has
**                   to be initialized.
** Returns:
**     Nothing.
** MP Synchronization
**     None needed because this only happens at boot time when there's
**     only one engine around.
*/
void
hsm_init_enginerandval(ENGINE_RESOURCE * eresourcep, int
numengines)
{
    int i;

for (i = 0; i < numengines; i++)
    {
        /*
        ** Initialize the freelock list and the number of
        ** freelocks in the cache to zero.
        */
        eresourcep->erslicerandomval = 0;
        eresourcep++;
    }
}
```

The Sysslices manager is responsible for maintaining and providing access to the rows of SYSPARTITIONS. It handles INSERT or DELETE of SYSPARTITIONS rows. The first method for the Sysslices manager is sl_row_insert method which inserts a row into SYSPARTITIONS table:

```
/*
** SL_ROW_INSERT
**
** Adds a row to the Syspartitions table to indicate creation of
** a new partition for the object.
**
** Parameters:
**     xdes  - transaction descriptor for current insert
**     rp    - pointer to row to insert
**
** Returns:
**     None.
**
** MP Synchronization:
**     None
**
** Side Effects:
**     opens and closes SYSPARTITIONS
**
*/
void
sl_row_insert(XDES         *xdes,
              BYTE *rp)
{
    SDES      *sdes;
    VOLATILE struct
    {
        SDES       *sysslices;
    }copy;
    SYB_NOOPT(copy);
    copy.sysslices = (SDES *) NULL;
    if (ex_handle(EX_ANY, EX_ANY, EX_ANY, (EXC_FUNC_PTR) hdl_heap))
    {
        if (copy. sysslices)
        {
            sdes = copy.sysslices;
            copy.sysslices = (SDES *) NULL;
            closetable (sdes);
        }
        EX_DELETE;
        ex_raise(SYSTEM, SYS_XACTABORT, EX_CONTROL, 1);
    }
    sdes = OPEN_SYSTEM_TABLE(SYSPARTITIONS, Pss->pcurdb, xdes->xdbptr,
            B1_MACXMPT);
    if (sdes == (SDES *)NULL)
    {
        ex_raise(SLICEMGR, SLICEMGR_NOSYSSLICES, EX_CONTROL, 1);
    }
    copy.sysslices = sdes;
    /* Set the lock and mode for insert */
    sdes->sstat = (SS_PGLOCK | SS_UPDLOCK | SS_L1LOCK);
    if (!beginupdate(xdes, sdes, XMOD_DIRECT, INSERT))
    {
        ex_raise(SLICEMGR, 0, EX_CONTROL, 1);
    }
    if (!insert(sdes, rp, sizeof(SYBPARTITION)))
```

-continued

```
        {
                ex_raise(SYSTEM, SYS_XACTABORT, EX_CONTROL, 1);
        }
        if (!endupdate(xdes))
        {
                ex_raise(SYSTEM, SYS_XACTABORT, EX_CONTROL, 1);
        }
        copy.sysslices = (SDES *) NULL;
        closetable (sdes);
}
```

This is performed by a separate routine so that updates to the system catalog are encapsulated, so that future changes are more easily dealt with. After setting a lock, a row is inserted by calling an insert method.

In a complementary manner, an sl_row_delete method deletes a row from the SYSPARTITIONS table:

```
/*
**   SL_ROW_DELETE
**
**   Parameters:
**       xdes   - transaction descriptor
**       objid  - object ID of partition to be deleted
**       slnum  - partition number being deleted
**
**   Returns:
**       None.
**
**   MP Synchronization:
**
**
**   Side Effects:
**
**
*/
void
sl_row_delete(XDES   *xdes,
              objid_t   objid,
              slnum_t   slnum)
{
        SDES    *sdes;          /* sdes for Syspartitions */
        SARG    keys[2];        /* for objid & slicenum */
        BUF     *bp;            /* buffer pointer */
        VOLATILE struct
        {
                SDES    *sysslices;
        }copy;
        SYB_NOOPT(copy);
        copy.sysslices = (SDES *) NULL;
        if (ex_handle(EX_ANY, EX_ANY, EX_ANY, (EXC_FUNC_PTR) hdl_heap))
        {
                if (copy.sysslices)
                {
                        sdes = copy.sysslices;
                        copy.sysslices = (SDES *) NULL;
                        closetable (sdes);
                }
                EX_DELETE;
                ex_raise(SYSTEM, SYS_XACTABORT, EX_CONTROL, 1);
        }
        sdes = OPEN_SYSTEM_TABLE(SYSPARTITIONS, Pss->pcurdb, xdes->xdbptr,
                        B1_MACXMPT);
        if (sdes == (SDES *)NULL)
        {
                ex_raise(SLICEMGR, SLICEMGR_NOSYSSLICES, EX_CONTROL, 2);
        }
        copy.sysslices = sdes;
        sdes->sstat |= (SS_PGLOCK | SS_UPDLOCK | SS_L1LOCK);
        /* Init scan of Syspartitions by objid and partition number */
        initarg(sdes, keys, 2);
        setarg(sdes, &Syspartitions[SL_OBJID], EQ, (BYTE *) &objid,
                sizeof (objid));
        setarg(sdes, &Syspartitions[SL_SLICENUM],
                EQ, (BYTE *) &slnum, sizeof(slnum));
        /* SCAN_FIRST because only one row must be there */
        startscan(sdes, SCAN_CLUST, SCAN_FIRST);
```

```
/* If table-not-found, error or deadlock */
if (!(bp = getnext(sdes)))
{
    ex_raise(SLICEMGR, SLICEMGR_NOROW, EX_DBFATAL, 1,
        objid, slnum, xdes->xdbptr);
}
/* Begin update */
if (!beginupdate(xdes, sdes, XMOD_DIRECT SYB_DELETE))
{
    ex_raise(SLICEMGR, 0, EX_CONTROL, 2);
}
/* Delete row from Syspartitions */
if (!row_delete(sdes, bp))
{
    ex_raise(SLICEMGR, SLICEMGR_DEL_FAIL, EX_CONTROL, 2,
        slnum, objid);
}
/* End update */
if (!endupdate (xdes))
{
    ex_raise(SYSTEM, SYS_XACTABORT, EX_CONTROL, 2);
}
/* Close Syspartitions */
copy.sysslices = (SDES *) NULL;
closetable (sdes);
}/* end sl_row_delete */
```

Upon locating the appropriate row, the method invokes a delete routine for deleting the row. This is followed by an end of the update.

The method sl_chgvalue is employed for interlocking change of the last page ID in the control page. This handles the situation where one transaction is attempting to update the last page while another transaction is reading the page. Accordingly, the operations are performed in an interlocking manner, with the aid of a spin lock. It may be constructed as follows:

```
/*
**  SL_CHGVALUE
**
**  Parameters:
**      xdes   -- xdes for transaction.
**      sdes   -- session descriptor for the target object.
**      slnum  -- target slice number.
**      field  -- specifies the field that is to be changed.
**      valp   -- pointer to the field value
**
**  Values for field are:
**  SLC_LASTPAGE - We are only updating the pageid of the this partitions
**      page chain's last page
**  SLC_LASTPG_PLUS- We are updating the pageid of the last page as well
**      as incrementing the counter that tracks the number of
**      allocations to this page chain.
**
**  Returns:
**      TRUE - success
**      FALSE - problems
**
**  MP Synchronization:
**
**  Side Effects:
**      Page is locked.
*/
int
sl_chgvalue (XDES    *xdes1
            SDES     *sdes,
            slnum_t  slnum,
            int      field,
            BYTE     *valp)
{
    int32       foffset;
    objid_t     objid;
    BUF         *bp;
    pgid_t      ctrlpg;
    SLICE_CTRLBLK  *ctrlblk_ptr;
    SLCACHE     *slc;
    int32       len;
    int32       cpdata[2]; /* control page data */
    SCAN_CONTEXT    scan_context;  /* needed to get control page */
```

```
/* get the target table's object id */
objid = SDES_OBJID(sdes);
slc = slcache_des_get(sdes->sdesp, slnum);
/* get pageid of control page from slcache */
slcache_getval(slc, SLC_CTRLPAGE, (BYTE *)&ctrlpg);
sdes->scur.pageid = ctrlpg;
/* exclusive lock the page before updating */
switch (pagelock(sdes, EX_PAGE, ctrlpg, (LOCKREC **)0))
{
    case LOCK_DEADLOCK:
        sdes->sridoff = DEADLOCK;
        ex_callprint(EX_NUMBER(SLICEMGR, SLICEMGR_DEADLOCK),
            EX_CONTROL, (int) Pss->pspid);
        return (FALSE);
    case LOCK_INTERRUPTED:
        return (FALSE);
}
/* Get scan_context for control page and fetch the page. */
getpage_init_scan_context(&scan_context, sdes, objid,
        TABENTRY, NULL_CACHEID);
bp = getpage_noscan(sdes, &scan_context);
ctrlblk_ptr = (SLICE_CTRLBLK *) ((BYTE *)bp->bpage
        + PAGEHEADSIZE);
/* Update the control page with new last pageid */
if (field == SLC_LASTPAGE)
{
    len = sizeof(pgid_t);
}
else if (field == SLC_LASTPG_PLUS)
{
    /* copy the lastpage id & increment alloc count */
    cpdata[0] = *((int32 *)valp);
    cpdata[1] = ctrlblk_ptr->scp_alloccount + 1;
    /* make valp point to the new values */
    valp = (BYTE *)&cpdata[0];
    len = sizeof(cpdata);
}
foffset = PAGEHEADSIZE + OFFSETOF(SLICE_CTRLBLK, scp_lastpage);
if (! (new_replace(sdes, bp, foffset, valp, len, XREC_CTRLPGMODIFY)))
{
    /* unkeep the buffer */
    bufunkeep(bp, sdes);
    return (FALSE);
}
/*
** Change the in-memory SLCACHE value for last page id.
** Do this AFTER we have made the on-disk change.
*/
slcache_change_lastpage(slc, *(pgid_t *)valp);
/* unkeep the buffer */
bufunkeep(bp, sdes);
return (TRUE);
}/* end of sl_chgvalue */
```

In operation, the method finds the cache which is desired to be updated. Next it gets the current value, followed by a page lock (because it is desired to update it in the control page as well). The control page is changed with a call to a new_replace method.

The method slcache_change_lastpage is a shorthand technique for changing information only in memory and can be implemented as follows:

```
/*
** slcache_change_lastpage
**
** Parameters:
**     slc          - slice cache pointer
**     lastpage     - new last page id
**
** Returns:
**     None
**
** MP Synchronization:
**
*/
void
slcache_change_lastpage (SLCACHE *slc, pgid_t lastpage)
{
    P_SPINLOCK(slc->sc_spin);
    slc->sc_root = lastpage;
    V_SPINLOCK(slc->sc_spin);
}
```

The update is protected with a spin lock.

The method sl_update_ctrlpg_pagecnt updates the control page page count and can be implemented as follows:

```
/*
**   SL_UPDATE_CTRLPG_PAGECNT
**
**
**   Parameters:
**      sdes       - sliced table's session descriptor
**      ctrlpg     - slice's control page id
**      pagecount  - for the slice
**
**   Returns:
**      none
**
**   MP Synchronization:
**
*/
void
sl_update_ctrlpg_pagecnt(SDES *sdes, pgid_t ctrlpg, int32 pagecount)
{
        BUF             *bp;
        SLICE_CTRLBLK   *scb;
        pgid_t          saved_page;
        SCAN_CONTEXT    scan_context;
        objid_t         objid;
        /* Save current page id of sdes before getting control page */
        saved_page = sdes->scur.pageid;
        sdes->scur.pageid = ctrlpg;
        /* Get scan_context for control page */
        objid = SDES_OBJID(sdes);
        getpage_init_scan_context(&scan_context, sdes, objid,
                  TABENTRY, NULL_CACHEID);
        bp = getpage_noscan(sdes, &scan_context);
        bufpredirty(bp);
        /* Make sure this is a control page */
        scb = (SLICE_CTRLBLK *)((BYTE *)bp->bpage + PAGEHEADSIZE);
        if (scb->scp_magic != SLICE_CTRLPG_MAGIC)
        {
              bufunpredirty (bp);
              bufunkeep (bp, sdes);
              sdes->scur.pageid = saved_page;
              ex_raise(SLICEMGR, SLICEMGR_NOTCTRLPG, EX_DBFATAL, 1,
                    ctrlpg, sdes->sslcacheptr->sc_slicenum,
                    objid);
        }
        /* Update allocation count */
        scb->scp_alloccount = pagecount;
        bufdirty(bp, sdes);
        bufunkeep(bp; sdes);
        /* Restore the saved page id back into sdes */
        sdes->scur.pageid = saved_page;
        return;
}
```

This is a low level routine which changes the number of pages allocated to a slice. When a new page is allocated, the page count is updated accordingly. In operation, the method finds the control page, then fetches it. The allocation count is updated. The buffer is marked as dirty so that the buffer is flushed to disk, thereby writing the value.

The method slcache_getnext_slice gets the cache for the next slice. It may be implemented as follows:

```
/*
**   SLCACHE_GETNEXT_SLICE
**
**   Parameters:
**      sdes -- Session descriptor to the sliced object.
**
**   Returns:
**      none.
**
**   Side Effects:
**      Updates the SDES fields.
**
**   Synchronizations:
```

-continued

```
**      None.
**
*/
void
slcache_getnext_slice(SDES *sdes)
{
        int32 slhigh;    /* highest slice num for the object */
        slhigh = SDES_NUMSLICES(sdes);
        if (slhigh == 1 )
        {   /* the table is not sliced */
              return;
        }
        if (sdes->sslcacheptr == (SLCACHE *)NULL)
        {
              /*
              ** Currently not positioned on any slice. Start from
              ** the first slice.
              */
              sdes->scurslice = 1;
        }
        if (sdes->scurslice == slhigh)
        {
              sdes->scurslice = 1;
```

```
        }
        else
        {
                sdes->scurslice++;
        }
        sdes->sslcacheptr = slcache_des_get(sdes->sdesp,
                sdes->scurslice); return;
}/* end of slcache_getnext_slice */
```

This moves, for instance, from the Nth slice cache to the N+1slice cache. In operation, the method first tests whether the table is sliced; if not, it simply returns. Next, the method starts from the first slice, if it is not currently positioned on any slice. Also, if the system is positioned on the last slice, it wraps around, by repositioning to the first slice. Otherwise, it simply increments the current slice. The cache pointer for the sdes data member is updated accordingly.

The method slcache_getval simply returns a particular value from the cache. It may be implemented as follows:

```
/*
** SLCACHE_GETVAL
**
** Parameters:
**      slc    -- pointer to the target SLCACHE structure.
**      field  -- field name (see slice.h)
**      value  -- returned value of the field.
**
** Returns:
**      length of the value returned. 0 if field is invalid.
**
** Side Effects:
**      None.
**
** Synchronizations:
**      Acquires and releases the slice spinlock to get last
**      page id. To get any other value, there is no need to
**      synchronize because they do not change unless
**      partition/unpartition is in progress in which case
**      there canbe only one user changing these values (due
**      to table-level lock)
**
*/
int
slcache_getval (SLCACHE *slc,
                int     field,
                BYTE    *value)
{
        int     field_size;
        int32   *valueptr;
        switch (field)
        {
                case SLC_SLICENUM:
                        valueptr = (int32 *) value;
                        *valueptr = slc->sc_slicenum;
                        field_size = sizeof(int32);
                        break;
                case SLC_FIRSTPAGE:
                        valueptr = (int32 *) value;
                        *valueptr = slc->sc_first
                        field_size = sizeof(int32);
                        break;
                case SLC_LASTPAGE:
                        valueptr = (int32 *) value;
                        P_SPINLOCK(slc->sc_spin);
                        *valueptr = slc->sc_root;
                        V_SPINLOCK(slc->sc_spin);
                        field_size = sizeof(int32);
                        break;
                case SLC_CTRLPAGE:
                        valueptr = (int32 *) value;
                        *valueptr = slc->sc_ctrlpg;
                        field_size = sizeof(int32);
                        break;
                default:
                        field_size = 0;
                        break;
        }
        return (field_size);
}/* end of slcache_getval */
```

This employs a main case statement, which passes the sought-after information back to the caller.

The method slcache_findslice finds the particular slice that contains a specified page ID. It may be implemented as follows:

```
/*
** SLCACHE_FINDSLICE
**
** Parameters:
**      des    -- ptr to the sliced object descriptor.
**      pageid -- pgid_t value.
**      type   -- There are three different types available:
**               SLC_LASTPAGE, SLC_FIRSTPAGE, or
**               SLC_CTRLPAGE
** Returns:
**      pointer to the SLCACHE or NULL, if there were no match.
**
** Side Effects:
**      none.
**
** Synchronizations:
**      Assumes the caller has a page level lock.
**
*/
SLCACHE *
slcache_findslice(DES *des, pgid_t findpage, int32 type)
{
        SLCACHE         *slice;
        SLGROUP         *slg;
        int32           i;
        int32           slicecount;    /* total # slices */
        int32           slicenum;      /* slice number */
        pgid_t          page;
        /* check the first slice cached in the des */
        slcache_getval(&des->dslinfo.sd_slice1, type, (BYTE *)&page);
        if( findpage == page)
                return(&des->dslinfo.sd_slice1);
        slicecount = des->dslinfo.sd_numslices;
        slicenum = 2;            /* first slice is already checked */
        slg = (SLGROUP *)des->dslinfo.next;
        while (slg != (SLGROUP *)NULL)
        {
                /* Search in the group */
                slice = slg->sga_data;
                for (i = 0; (i<SLCACHE_COUNT) && (slicenum <= slicecount);
                        i++, slicenum++)
                {
                        slcache_getval(slice, type, (BYTE *)&page);
                        if (page == findpage)
                        {
                                return slice;
                        }
                        slice++;
                }
                slg = (SLGROUP *)slg->next;
        }
        return ((SLCACHE *)NULL);
}/* end of slcache_findslice */
```

Given a page ID, the method scans all the caches of the object to see which contains this page as the last page. The cache ID is returned to the caller. The scan is performed within a "while" loop, which compares the passed-in page (findpage) against the current page listed in the cache. When a match is found, the slice is returned.

The slcache_des_get set finds the slice cache for a given slice, returning a pointer to the caller. It may be implemented as follows:

```
/*
** SLCACHE_DES_GET
**
** Parameters:
**     des   -- ptr to the sliced object's descriptor
**     snum  -- slice number
**
** Returns:
**     Pointer to the SLCACHE structure for the snum.
**
** Side Effects:
**     None.
**
** Synchronizations:
**     None.
**
*/
SLCACHE *
slcache_des_get(DES *des,
       slnum_t snum)
{
    int32     i;      /* loop counter */
    int32     grpnum; /* slice group number */
    int32     offset; /* offset within the group */
    SLGROUP   *slg;   /* ptr to SLGROUP */
    if (snum == 1)
    {
        return(&des->dslinfo.sd_slice1);
    }
    slg = (SLGROUP *)des->dslinfo.next;
    if (slg == (SLGROUP *)NULL)
    {
        ex_raise(SLICEMGR, SLICEMGR_INVALID,
           EX_RESOURCE, 1,
              snum, des->dobjectc.objostat.objid);
    }
    /* calculate the SLGROUP of offset of the slcache we want */
    grpnum = (snum - SL_COUNT_NORMALIZER)/
    SLCACHE_COUNT;
    offset = (snum - SL_COUNT_NORMALIZER) %
    SLCACHE_COUNT;
    for (i = 0; i < grpnum; i++)
    {
        slg = (SLGROUP *)slg->next;
    }
    return(&(slg->sga_data[offset]));
}/* end of slcache_des_get */
```

If the slice is a first slice, the method simply returns a pointer to the des; recall that the first cache entry is stored in the des. Otherwise, it searches all the groups to find a slice number. As soon as a cache is found with the slice number, it is returned.

The method slcache_fill fills in the cache structure for a table, which occurs when the table is first instantiated. The method may be implemented as follows:

```
/*
** SLCACHE_FILL
**
** Parameters:
**     des --    ptr to the sliced object's descriptor
**     dbt --    ptr to the dbtable
**     segment -- segment map for table being sliced
**
** Returns:
**     1 if SYSPARTITIONS does not exist.
**     status
**
** Side Effects:
**     One or more SLGROUPs might be grabbed and linked to
**     the object's DES.
**     For each slice, a SLCACHE is filled-in.
**     Opens and closes the Syspartitions table.
**
** Synchronizations:
**     Acquires and releases a shared intent table lock
**     on Syspartitions.
**
*/
int32
slcache_fill(DES *des,
        DBTABLE  *dbt,
        short    segment)
{
    SDES           *slice_sdes;
    SDES           *syssdes;
    SARG           args1[1];
    LOCKREC        *lockrecp;
    int            lockret;
    int32          slnum;
    objid_t        userobjid;
    BUF            *bp;
    SLGROUP        *slg;
    SLCACHE        *slc;
    SYBPARTITION   *slice;
    SLGROUP        *tail = NULL;
    SLINFO         *info;
    int32          devcount;
    int32          elemcount;
    int32          offset;
    uint32         devmap[MAXVIRT];
    SLICE_AFFTBL   afftbl;
    int32          i;
    SCAN_CONTEXT   scan_context;
    info = &(des->dslinfo);
    /*
    ** Open syspartitions. Note that we do not use the dbtable to
    ** fetch the sdes in case we have not yet been upgraded to
    ** System 11.
    */
    slice_sdes = OPEN_SYSTEM_TABLE(SYSPARTITIONS,
    dbt->dbt_dbid, (DBTABLE *) UNUSED, B1_MACXMPT);
    if (slice_sdes == NULL)
    {
        /* This means that Syspartitions does not exist yet. We are
        ** either in upgrade or have yet to run upgrade, so fill the
        ** necessary information in the des, treat it as an unsliced
        ** table, and return.
        */
        slc = &des->dslinfo.sd_slice1;
        slc->sc_slicenum = 1;
        slc->sc_ctrlpg = 0;
        slc->sc_spin = (struct spinlock *)NULL;
        des->dslinfo.sd_numslices = 1;
        return(SM_SUCCESS);
    }
    slice_sdes->sstat = (SS_PGLOCK | SS_L1LOCK);
    if ((lockret = LOCK_TABLE(slice_sdes, SH_INT,
    SYSPARTITIONS, Pss->pstmtlocks, &lockrecp)) < 0)
    {
        /* Failed with LOCK_DEADLOCK or
        LOCK_ATTENTION */
        closetable (slice_sdes);
        ex_raise(SYSTEM, SYS_XACTABORT, EX_CONTROL, 0);
    }
    /*
    ** Scan for the instances of the object in syspartitions.
    **
    ** The clustered index on objid/sliceid on the syspartitions
    ** table guarantees that the rows will be returned in sliceid order
    */
    userobjid = des->dobjectc.objostat.objid;
    initarg(slice_sdes, args1, 1);
    setarg(slice_sdes, &Syspartitions [SL_OBJID],
         EQ, (BYTE *)&userobjid, sizeof(userobjid)),
    startscan(slice_sdes, SCAN_CLUST, SCAN_NORMAL);
    /* get a pointer to slice 1's SLCACHE */
    slc = &des->dslinfo.sd_slice1;
    if ((bp = getnext(slice_sdes)) == (BUF *)NULL)
    {
        /* the table is not sliced */
        slc->sc_slicenum = 1;
        slc->sc_ctrlpg = 0;
        slc->sc_spin = (struct spinlock *)NULL;
        des->dslinfo.sd_numslices = 1;
```

```
            des->dslinfo.next = (SLGROUP *) NULL;
        /* release the lock on Syspartitions */
            if (lockrecp)
            {
                lock_release(lockrecp);
                lockrecp = NULL;
            }
            closetable(slice_sdes);
            return(SM_SUCCESS);
        }
    /* We have a sliced table.
    ** Fill-in the in-memory SLCACHE structure with the
    ** info contained in the Syspartitions row. We also need
    ** to read the control page of each slice, to get the lastpage
    ** id. However, we do not have a session descriptor for the
    ** object (we are in the process of filling in the DES!).
    ** So, we have to resort to borrowing. That is, use a system
    ** DES and SDES to read in the slice control page.
    ** Get a sdes ptr, and pass it down for reading
    ** a control page.
    */
        syssdes = OPEN_SYSTEM_TABLE
            (OPEN_SYSALLOCPG_WITH_DBT, 0, dbt, B1_MACXMPT);
        /* disable object id checking in getpage( ), as we are
        ** using a borrowed sdes.
        */
        syssdes->sstat = SS_NOCHECK;
        /* First fill-in for slice 1. The row has already been read */
        slice = (SYBPARTITION *)slice_sdes->srow;
        slcache__fillcache(syssdes, des, slc, slice);
        slnum = 1; /* First slice has already been processed */
        while ((bp = getnext(slice_sdes)) != (BUF *)NULL)
        {
            slnum++;
            /* check if we need to grab a SLGROUP structure */
            if ((!( HSM_CHECK_SLGROUPALLOC(slnum))))
            {
                /* grab a SLGROUP, and link it to the DES */
                if ((slg = hsm_get_slgroup(1)) == (SLGROUP *)NULL)
                {
                    /* Release any groups we got so far */
                    if (des->dslinfo.next != (SLGROUP*)NULL)
                        hsm_free_slgroup(&(des->dslinfo.next));
                    ex_raise(SLICEMGR, SLICEMGR_NOSLGROUP,
                        EX_RESOURCE, 2);
                }
                else
                {
                    slc = &slg->sga_data[0];
                    /* put new slgroup at the tail of the list */
                    if (tail == NULL)
                    {
                        info->next = slg;
                    }
                    else
                    {
                        tail->next = slg;
                    }
                    tail = slg;
                    /* terminate end of list with NULL */
                    slg->next = NULL;
                }
            }
            else
            {
                slc = slcache_des_get(des, slnum);
            }
            slice = (SYBPARTITION *)slice_sdes->srow;
            slcache_fillcache(syssdes, des, slc, slice);
        }/* end of while */
        /* release the lock on Syspartitions */
        if (lockrecp)
        {
            lock_release(lockrecp);
            lockrecp = NULL;
        }
        closetable (slice_sdes);
        /* set the num of slices in des */
        des->dslinfo.sd_numslices = slnum;
        /* Fill-in the device affinity table for each slice.
```

```
    ** This information is maintained on each control page,
    ** and is refreshed at the time the DES is reinstated.
    **
    ** Note: control page changes for the slice affinity are NOT
    ** logged. See the notes in slice.h.
    **
    ** First, we build a bit map of DBTABLE.dbt_map array indexes
    ** that are applicable to this object.
    **
    ** If the database is read-only, do not build the map because
    ** the control page cannot be written to disk.
    */
        if (dbt->dbt_stat & DBT_RDONLY)
        {
            closetable(syssdes);
            return (SM_SUCCESS);
        }
        devcount = hsm_map_objdev(segment, des->ddbtable, devmap);
        for (i = 1; i <= slnum; i++)
        {
            /* read-in the control page of the slice */
            slc = slcache_des_get(des, i);
            syssdes->scur.pageid = slc->sc_ctrlpg;
            /*
            ** Get scan_context for control page.
            ** NOTE ** This is an unusual case. Since we are
            ** instantiating the des we don't have an sdes yet
            ** so  so we can't call getpage_init_scancontext
            ** we must call des_get_indcache
            */
            scan_context.cid = des_get_indcache(des, TABENTRY);
            bp = getpage_noscan(syssdes, &scan_context);
            /* build the affinity table for the slices */
            elemcount = hsm_build_slicemap(syssdes, i, slnum, devcount,
                            devmap, &afftbl);
            /* move the affinity info in the control page */
            bufpredirty(bp);
            offset = PAGEHEADSIZE + sizeof (struct slice_ctrlblk);
            MEMMOVE((BYTE *)&afftbl, (BYTE *) bp->bpage + offset,
                sizeof(struct slice_afftbl));
            bufdirty(bp, syssdes);
            bufunkeep(bp, syssdes);
        }
        closetable (syssdes);
        return (SM_SUCCESS);
    }/* end of slcache_fill */
```

In operation, the method goes to the control page and instantiates the cache for the object, allocating any necessary memory. Also, it opens the SYSPARTITIONS table for determining where the control pages are. If the SYSPARTITIONS table does not exist, then the system is dealing with a prior version table, which does not support slices. Accordingly, it treats it as an unsliced table and returns. Otherwise, the method scans for instances of the object in the SYSPARTITIONS table. If the cache is found, it will enter a "while" loop for filling each cache based on the next slice retrieved. This is followed by filling the device affinity table for each slice.

The method slcache_fillcache simply fills in the cache for a particular slice. It may be implemented as follows:

```
/*
**  SLCACHE_FILLCACHE
**
**  Parameters:
**      syssdes --  ptr to a system sdes that we "borrow"
**                  to read the control page.
**      des --      ptr to the sliced object's descriptor
**      slc --      ptr to a SLCACHE structure
**      slice --    ptr to a row of SYBPARTITION
**
**  Returns:
**          none.
```

-continued

```
**
** Side Effects:
**
** Synchronizations:
**
**
*/
void
slcache__fillcache(SDES     *syssdes,
                   DES      *des,
                   SLCACHE  *slc,
                   SYBPARTITION *slice)
{
    BUF          *bp;
    SLICE_CTRLBLK *scb;
    SCAN_CONTEXT  scan_context;
    slc->sc_slicenum = GETLONG(&slice->sl_slicenum);
    slc->sc_first = GETLONG(&slice->sl_first);
    slc->sc_ctrlpg = GETLONG(&slice->sl_ctrlpg);
    syssdes->scur.pageid = slc->sc_ctrlpg;
    /*
** Note, we are going to use a borrowed SDES to
** read in the control page so we must call des_get_indcache
*/
    scan_context.cid
    =
    des_get_indcache(des,
    TABENTRY);
    bp =
    getpage_noscan(syssdes,
    &scan_context);
    scb
    =
    (SLICE_CTRLBLK
    *)
    ((BYTE
    *)
    (bp->bpage)
    +
    PAGEHEADSIZE);
    slc->sc_root
    =
    scb->scp_lastpage;
    bufunkeep(bp,
    syssdes);
    slc->sc_spin
    =
    hsm_get_slicelk(
    );
}/* end of slcache_fillcache */
```

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system storing information in a database table, said database table comprising rows of data records stored on data pages, a method for appending data records from a client to said database table comprising:

linking said data pages together to form a single physical page chain in memory, said page chain having a first page and a last page;

receiving a request from said client for dividing said database table into a number of partitions;

in response to said request, dividing said page chain into a number of partitions, each partition comprising a physical page chain having a last page so that multiple last pages are available to the system for appending data records;

receiving a request for appending records to the end of said database table;

in response to said request, selecting one of said partitions for appending records to the end of said database table; and appending said data records from said client to the last page of said selected partition, while at the same time other partitions remain available to other clients for appending records.

2. The method of claim 1, wherein said appending step includes:

locking said last page while appending said data records to said selected partition, so that other clients cannot append records concurrently to the last page of the same partition.

3. The method of claim 1, wherein said request from said client for dividing said database table into a number of partitions comprises an SQL ALTER request to alter a table.

4. The method of claim 1, wherein said step of selecting one of said partitions for appending records comprises:

selecting at random one of said partitions for appending records.

5. The method of claim 1, wherein said request for appending records comprises a database transaction, wherein said step of selecting one of said partitions for appending records comprises selecting at random one of said partitions for appending records, and wherein said step of appending said data records comprises appending to the last page of said randomly selected partition.

6. The method of claim 5, wherein said randomly selected partition is employed for appending records throughout the duration of said transaction.

7. The method of claim 1, wherein said step of selecting one of said partitions for appending records comprises:

selecting in a round-robin fashion one of said partitions for appending records.

8. The method of claim 1, wherein said step of dividing said page chain into a number of partitions includes:

creating for each particular partition a control page describing where the last page is located for the page chain of the particular partition.

9. The method of claim 8, further comprising:

storing the control page for said selected partition in a cache memory.

10. The method of claim 8, further comprising:

updating said control page stored in the cache memory, when a new last page is allocated for said selected partition.

11. The method of claim 1, wherein said number of partitions is configurable by a user of the client.

12. The method of claim 1, further comprising:

receiving a request from the client to scan said database table; and in response to said request to scan said database table, scanning the page chain of each partition successively in turn, until all page chains for said database table have been scanned.

13. The method of claim 12, wherein said request from said client for scanning said database table comprises a standard SQL request, so that said scanning of the page chain of each partition successively in turn remains transparent to said client.

14. The method of claim 1, wherein said database table is logically indexed by at least one index.

15. The method of claim 14, wherein said at least one index comprises a B-tree index storing record pointers at its leaf-level nodes.

16. The method of claim 1, wherein said request for appending records to the end of said database table comprises a standard SQL INSERT request, so that appending said data records from said client to the last page of said selected partition remains transparent to said client.

17. The method of claim 1, further comprising:

allocating a new last page for said selected partition, when the existing last page for said selected partition is full; and linking said new last page into the particular page chain for said selected partition.

18. The method of claim 1, further comprising:

receiving information specifying storage devices available for storing said database table; and wherein said step of dividing said page chain into a number of partitions comprises mapping a particular page chain of each partition to a particular device.

19. The method of claim 18, wherein said mapping step comprises:

mapping a particular page chain of each partition to a particular device based on how many devices are available for storage of the database table and how many partitions are created.

20. The method of claim 1, further comprising:

receiving a request from the client for determining whether said database table is empty;

in response to said request for determining whether said database table is empty, examining the first page of the page chain of each partition successively in turn, until either a row is found on the first page of one of the page chains or until the first page of each page chain has been examined.

21. In a multi-user computer system where contention exists for appending items to one end of an object, said object storing items in a plurality of data pages, an improved method for appending items to the object comprising:

storing said object as a single logical page chain comprising multiple individual physical page chains, each individual physical page chain having a last page for insertion of items;

receiving a first request from a first client for appending an item to said object;

selecting a first one of said individual physical page chains;

receiving a second request from a second client for appending an item to said object;

selecting a second one of said individual physical page chains; and appending items from said first client to the last page of first selected page chain while concurrently appending items from said second client to the last page of second selected page chain.

22. The method of claim 21, wherein said appending step includes:

locking said last page of said first selected page chain by said first client and locking said last page of said second selected page chain by said second client, so that each client has exclusive access to the last page of the page chain to which it is appending records.

23. The method of claim 21, wherein said first selected page chain and said second selected page chain are selected randomly by the system.

24. The method of claim 21, wherein said first selected page chain and said second selected page chain are selected in a round-robin manner by the system.

25. The method of claim 21, wherein said object includes a database table.

26. The method of claim 25, wherein said database table comprises a log storing records which are sequentially appended to one end of the table.

27. The method of claim 21, further comprising:

receiving a request to scan the data pages of the object;

in response to said request to scan said data pages of the object, scanning each page chain of said multiple individual physical page chains, successively in turn, until all page chains for said object have been scanned.

28. A database management system for storing and processing a database table comprising:

a computer having a processor, a memory, and a plurality of storage devices;

means for dividing said database table into a number of partitions, each partition comprising a physical page chain having a last page so that multiple last pages are available to the system for appending data records, each physical page chain being stored on a particular one of said plurality of storage devices;

input means for inputting a request from a client for appending records to the end of said database table;

means, responsive to said request, for selecting one of said partitions for appending records to the end of said database table; and means for appending said data records from said client to the last page of said selected partition, while at the same time other partitions remain available to other clients for appending records.

29. The system of claim 28, wherein said means for dividing said database table into a number of partitions includes:

device affinity means for assigning each partition to a particular one of said storage devices based on how many storage devices are available for storage of the database table and how many partitions are created.

30. The system of claim 29, wherein said device affinity means includes:

means for assigning each partition to a particular one of said storage devices in round-robin manner until all partitions have been assigned.

* * * * *